(12) United States Patent
Maes et al.

(10) Patent No.: US 12,706,432 B2
(45) Date of Patent: Aug. 11, 2026

(54) SYSTEMS AND METHODS TO REDUCE THE POWER CONSUMPTION OF AN OPTICAL FIBER AMPLIFIER

(71) Applicant: HUAWEI TECHNOLOGIES CO., LTD., Shenzhen (CN)

(72) Inventors: Frédéric Maes, Québec city (CA); Lixian Wang, Quebec (CA); Zhiping Jiang, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1169 days.

(21) Appl. No.: 17/710,479

(22) Filed: Mar. 31, 2022

(65) Prior Publication Data

US 2023/0318249 A1 Oct. 5, 2023

(51) Int. Cl.

| | |
|---|---|
| ***H01S 3/00*** | (2006.01) |
| ***H01S 3/067*** | (2006.01) |
| ***H01S 3/10*** | (2006.01) |
| *H04B 10/293* | (2013.01) |
| *H04B 10/296* | (2013.01) |

(52) U.S. Cl.

CPC ........ *H01S 3/06779* (2013.01); *H01S 3/1001* (2019.08); *H01S 3/10023* (2013.01); *H04B 10/2935* (2013.01); *H04B 10/296* (2013.01)

(58) Field of Classification Search

CPC ............... H01S 3/06779; H01S 3/1001; H01S 3/10023; H04B 10/2935; H04B 10/296

See application file for complete search history.

(56) References Cited

U.S. PATENT DOCUMENTS

| | | | | |
|---|---|---|---|---|
| 6,233,092 | B1 | 5/2001 | Flood et al. | |
| 9,379,512 | B2 | 6/2016 | Digiovanni et al. | |
| 10,348,051 | B1 * | 7/2019 | Shah | G01S 17/34 |

(Continued)

FOREIGN PATENT DOCUMENTS

| | | | |
|---|---|---|---|
| EP | 0973276 A2 * | 1/2000 | H04B 10/2841 |
| EP | 2751942 B1 * | 8/2018 | H04J 14/021 |

OTHER PUBLICATIONS

W. J. Miniscalco, "Erbium-Doped Glasses for Fiber Amplifiers at 1500 nm," J. Light. Technol., vol. 9, No. 2, pp. 234-250, 1991, doi: 10.1109/50.65882.

(Continued)

*Primary Examiner* — Mark Hellner

(57) ABSTRACT

A method of reducing the power consumption of an optical fiber amplifier by which the optical output of a first optical fiber is filtered to prevent a detrimental portion of the optical output from reaching a second optical fiber, to transmit a signal for amplification, and to transmit a portion of the optical output that can contribute to optical pumping of the second optical fiber. By propagating an optical pumping portion output from the first optical fiber, as well as optical pumping from an independent source, the independent source's power level can be reduced. In a sequence of optical fibers, each fiber can provide some pumping output to one or more other fibers, as long as its optical output is properly filtered with appropriate optical components, such as a band-stop filter. A sequence can be terminated by a low-pass filter in order for a final output to contain the amplified signal free from any other optical output.

23 Claims, 21 Drawing Sheets

(56) References Cited

U.S. PATENT DOCUMENTS

| | | | | |
|---|---|---|---|---|
| 2003/0137722 | A1* | 7/2003 | Nikolajsen | C03C 13/045 359/341.1 |
| 2003/0151800 | A1* | 8/2003 | Song | H01S 3/06758 359/341.1 |
| 2006/0087723 | A1* | 4/2006 | Takeyama | H04B 10/296 359/337 |
| 2017/0085052 | A1* | 3/2017 | Zhao | H01S 3/094003 |
| 2023/0131148 | A1* | 4/2023 | Frankel | G02B 6/02328 398/20 |

OTHER PUBLICATIONS

F. A. Flood, "L-Band Erbium-Doped Fiber Amplifiers," in OFC, No. paper WG1, pp. 1-4, 2000.

Rapp, "Noise figure limit of L-band EDFAs," AEU-Archiv fur Elektron. und Ubertragungstechnik, vol. 56, No. 2, pp. 109-114, 2002, doi: 10.1078/1434-8411-54100079.

J. Lee et al., "Enhancement of power conversion efficiency for an L-Band EDFA with a secondary pumping effect in the unpumped EDF section," IEEE Photonics Technol. Lett., vol. 11, No. 1, pp. 42-44, 1999, doi: 10.1109/68.736384.

M. A. Mahdi et al., "Gain enhanced L-band Er3+-doped fiber amplifier utilizing unwanted backward ASE," IEEE Photonics Technol. Lett., vol. 13, No. 10, pp. 1067-1069, 2001, doi: 10.1109/68.950737.

F. Roy et al., "Experimental validation of ASE reflection schemes for the design of a +20-dBm, single-pump, L-band EDFA," in Optical Amplifiers and Their Applications/Integrated Photonics Research, 2004, p. JWB6, doi: 10.1364/IPR.2004.JWB6.

K. S. Abedin et al., "Cladding-pumped erbium-doped multicore fiber amplifier," Opt. Express, vol. 20, No. 18, p. 20191, Aug. 2012, doi: 10.1364/OE.20.020191.

F. A. Flood et al., IEEE Photonics Technol. Lett., vol. 11, No. 10, pp. 1232-1234, Oct. 1999, doi: 10.1109/68.789701.

C. Lei et al., JOSAB, vol. 37, No. 8, p. 2345, Aug. 2020, doi: 10.1364/josab.392291.

F. E. Durak et al., Opt. Fiber Technol., vol. 45, No. 7, pp. 217-222, Nov. 2018, doi: 10.1016/j.yofte.2018.07.014.

M. Cantono et al., "Opportunities and Challenges of C+L Transmission Systems", in Journal of Lightwave Technology, vol. 38, No. 5, pp. 1050-1060, 1 Mar. 1, 2020, doi: 10.1109/JLT.2019.2959272.

* cited by examiner

Prior Art

SYSTEMS AND METHODS TO REDUCE THE POWER CONSUMPTION OF AN OPTICAL FIBER AMPLIFIER

CROSS-REFERENCE TO RELATED APPLICATIONS

This is the first application filed for the present invention.

TECHNICAL FIELD OF THE INVENTION

This invention pertains generally to the field of optical fiber amplifiers and in particular, to systems and methods to reduce the power consumption of an erbium-doped optical fiber amplifier operating in the L-band of the optical spectrum.

BACKGROUND

Erbium-doped fiber amplifiers (EDFA) are often part of the backbone of optical telecommunication networks, including the internet. Indeed, as optical signals containing information propagate in a network, their power is continuously degraded by background losses of the optical fibers, as well as other components constituting the network. To mitigate this issue or extend the reach of a network, optical fiber amplifiers are installed along transmission links, in order to regenerate the signals. The EDFAs can be separated by tens or hundreds of kilometers (km). In recent years, data is transmitted over two spectral bands: the conventional band (C-band), which is approximately from 1525 nm and 1570 nm, and the more recently implemented long band (L-band), which is approximately from 1575 nm to 1626 nm. EDFAs have been developed to provide amplification over both bands.

In terms of performance however, L-band EDFAs have lagged behind C-band EDFAs, mainly in bandwidth, power conversion efficiency (PCE), noise figure (NF), and footprint. This is because the emission cross-section of erbium ions in the L-band is only about 10% of their emission cross-section in the C-band. In general, an L-band EDFA is therefore less efficient than a C-band EDFA.

This has led to an L-band EDFA requiring longer fiber lengths and larger optical pumping powers, to achieve gain levels comparable to those of a comparable C-band EDFA. Furthermore, along the length of an erbium-doped fiber (EDF) of an L-band EDFA, there can be significant build-up of amplified spontaneous emission (ASE) in the C-band as well. This can reduce the amount of excited erbium ions available for the amplification of L-band optical signals and therefore reduce the energy state inversion in the EDF (i.e. population inversion). This in turn can deteriorate an EDFA's performance in terms of noise figure (i.e. increased NF), gain (i.e. decreased gain), and power conversion efficiency (i.e. decreased PCE).

To circumvent these issues, an EDFA can be split into multiple segments, each segment including an optical amplifier (OA) enabling the amplification of optical signals in the range of a respective EDF, such as between 1575 nm and 1626 nm. The impact of an OA's noise figure on the EDFA's total noise is reduced if the OA is further down the EDFA's amplification chain, and therefore the overall effect of subdividing an EDFA into several segments is to strike a balance between gain, noise figure and PCE in order to meet the requirements.

An EDFA operating in the L-band is typically designed to provide between 15 dB and 35 dB of external gain (useful gain) to wavelengths between 1575 nm and 1626 nm. To that extent, the OAs composing the EDFA provide between 20 dB and 65 dB of combined internal gain over the same wavelength range. However, the same EDFA typically provides internal gain for C-band wavelengths as well. This in turn allows the growth of strong C-band ASE within the OAs, which reduces their inversion level (defined hereunder) through optical saturation, and deteriorates the overall performance of the L-band EDFA, i.e. its noise figure is increased and its PCE is decreased. To alleviate this issue, a low-pass filter (LPF) can be positioned after each OA in order to filter out C-band radiation. By discarding C-band ASE between the OAs composing an EDFA however, power is being wasted.

The existing prior art methods to prevent wasting optical power by recycling C-band radiation have the drawback of increasing the EDFA's noise figure and/or requiring one or more additional devices within an OA.

Therefore, there is a need for methods and systems to prevent optical pumping power in an EDFA from being wasted, without overly degrading the EDFA's noise figure or adding further components to a system, and such would obviate or mitigate one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

Embodiments of the present invention allow an overall reduction in the consumption of optical pumping power by an L-band erbium-doped fiber amplifier (EDFA), thereby increasing its power conversion efficiency (PCE). Power consumption is reduced without the EDFAs noise figure surpassing a pre-determined noise figure limit, at any of its wavelengths of operation.

In an EDFA that is segmented into multiple successive optical amplifiers (OA), one or more OAs can be followed by a band-stop filter (BSF). A BSF can filter out amplified C-band radiation that could otherwise saturate erbium ions of a subsequent OA, preventing them from amplifying L-band radiation instead. In contrast to a low-pass filter (LFP) however, a band-stop filter (BSF) can not only filter out detrimental C-band radiation, but it can simultaneously allow non-detrimental, or beneficial C-band radiation, to be propagated to further OAs.

The beneficial C-band radiation can be beneficial because, in the case of EDFAs, instead of causing erbium ions to transition from the excited energy level to the ground energy level, thereby reducing the inversion level of the EDFA, it can promote the excitation of erbium ions in the ground energy state to the excited energy state, thereby increasing the inversion level of the EDFA and improving its L-band amplification performance. To a person of ordinary skill in the art of optical amplification, such transition from a lower to a higher energy state is known as "pumping".

In an L-band EDFA according to embodiments, C-band radiation that is produced or amplified during the amplification of L-band signals, is filtered out of the amplified L-band signals into detrimental C-band radiation and beneficial C-band radiation, and the beneficial C-band radiation is used to pump at least one further OA.

Technical benefits of EDFAs according to embodiments include a reduced consumption of the pumping power required to maintain the power level of a signal propagated by the EDFA, such reduced energy consumption being achieved without increasing the noise level of the EDFA beyond a specified threshold.

Embodiments include a system for amplifying an optical signal comprising: a first optical amplifier including an emitting segment of doped optical fiber emitting an optical output, the optical output including the optical signal at a first wavelength band, the optical output also having an optical surplus wavelength band and an optical pumping wavelength band; at least one optical component, and a second optical amplifier including a receiving segment of doped optical fiber; wherein: the at least one optical component receives the optical output from the emitting segment of doped optical fiber and is configured to prevent at least part of the optical surplus wavelength band from propagating to the receiving segment of doped optical fiber, and transmit the optical pumping wavelength band from the emitting segment of doped optical fiber to the receiving segment of doped optical fiber; and the receiving segment of doped optical fiber is doped to: be optically pumped by the optical pumping wavelength band, and amplify the optical signal by stimulated emission of radiation.

In some aspects, an optical component is a band-stop filter.

In some aspects, a system further comprises at least one independent source of optical radiation appropriate to optically pump at least one segment of optical fiber.

In some aspects, a system further comprises, between the emitting segment of doped optical fiber and the receiving segment of doped optical fiber, at least one of a gain flattening filter, a variable optical attenuator, an optical isolator, a wavelength-division multiplexer, a wavelength-division demultiplexer, a lens, and an optical circulator.

In some aspects, the receiving segment of doped optical fiber is configured to amplify optical signals with optical wavelengths in the L-band.

In some aspects, at least one segment of doped optical fiber is doped with erbium ions.

In some aspects, at least one segment of doped optical fiber includes oxide glass.

In some aspects, the oxide glass is silicate glass.

In some aspects, at least one segment of doped optical fiber includes fluoride glass.

In some aspects, the fluoride glass is one of zirconium fluoride glass and indium fluoride glass.

In some aspects, at least one segment of doped optical fiber includes chalcogenide glass.

In some aspects, at least one segment of doped optical fiber lies in parallel next to at least one other segment of doped optical fiber to form a cable to direct the optical output from the cable to the same optical component.

In some aspects, the cable is ribbonized such that the multiple segments of optical fiber lie in parallel on a common plane.

In some aspects, at least one segment of optical fiber has multiple cores, such that the optical output from each core is directed to the same optical component.

In some aspects, the optical fiber cores are ribbonized such that the multiple optical fiber cores lie on a common plane.

In some aspects, at least one segment of optical fiber is a segment of multi-mode optical fiber, the optical output of which includes multiple optical modes that are directed to the same optical component.

In some aspects, the at least one optical component has a rejection level for the optical surplus portion that is greater than 10 dB.

In some aspects, an optical component is any of a thin film filter, a fiber Bragg grating, a volume Bragg grating, and a micro-structured optical fiber.

In some aspects, a receiving segment of doped optical fiber emits an amplified optical output that includes the optical signal after being amplified.

Some aspects further include a low-pass filter for attenuating portions of the amplified optical output other than the optical signal after being amplified.

In some aspects, the first optical amplifier including an emitting segment of doped optical fiber, and the second optical amplifier including a receiving segment of doped optical fiber, are configured in series such that an intermediate optical amplifier including an intermediate segment of doped optical fiber in the series is both a receiving segment of doped optical fiber and an emitting segment of doped optical fiber.

Embodiments include a method of amplifying an optical signal comprising a receiving segment of doped optical fiber receiving from an emitting segment of doped optical fiber, via an optical component, an optical output that includes the optical signal at a first wavelength band, and an optical pumping wavelength band; and amplifying the optical signal by stimulated emission of radiation; wherein the optical component is operative to prevent at least part of an optical surplus wavelength band of the optical output from propagating to the receiving segment of doped optical fiber, and transmit the optical pumping wavelength band from the emitting segment of doped optical fiber to the receiving segment of doped optical fiber; and the receiving segment of doped optical fiber is doped to: be optically pumped by the optical pumping wavelength band, and amplify the optical signal by stimulated emission of radiation.

In some aspects, the at least one optical component is a band-stop filter.

Some aspects further include at least one segment of doped optical fiber receiving from at least one independent source, optical radiation appropriate to optically pump the at least one segment of doped optical fiber.

BRIEF DESCRIPTION OF THE DRAWINGS

It will be noted that throughout the appended drawings, like features are identified by like reference numerals.

DETAILED DESCRIPTION

Figure 1:
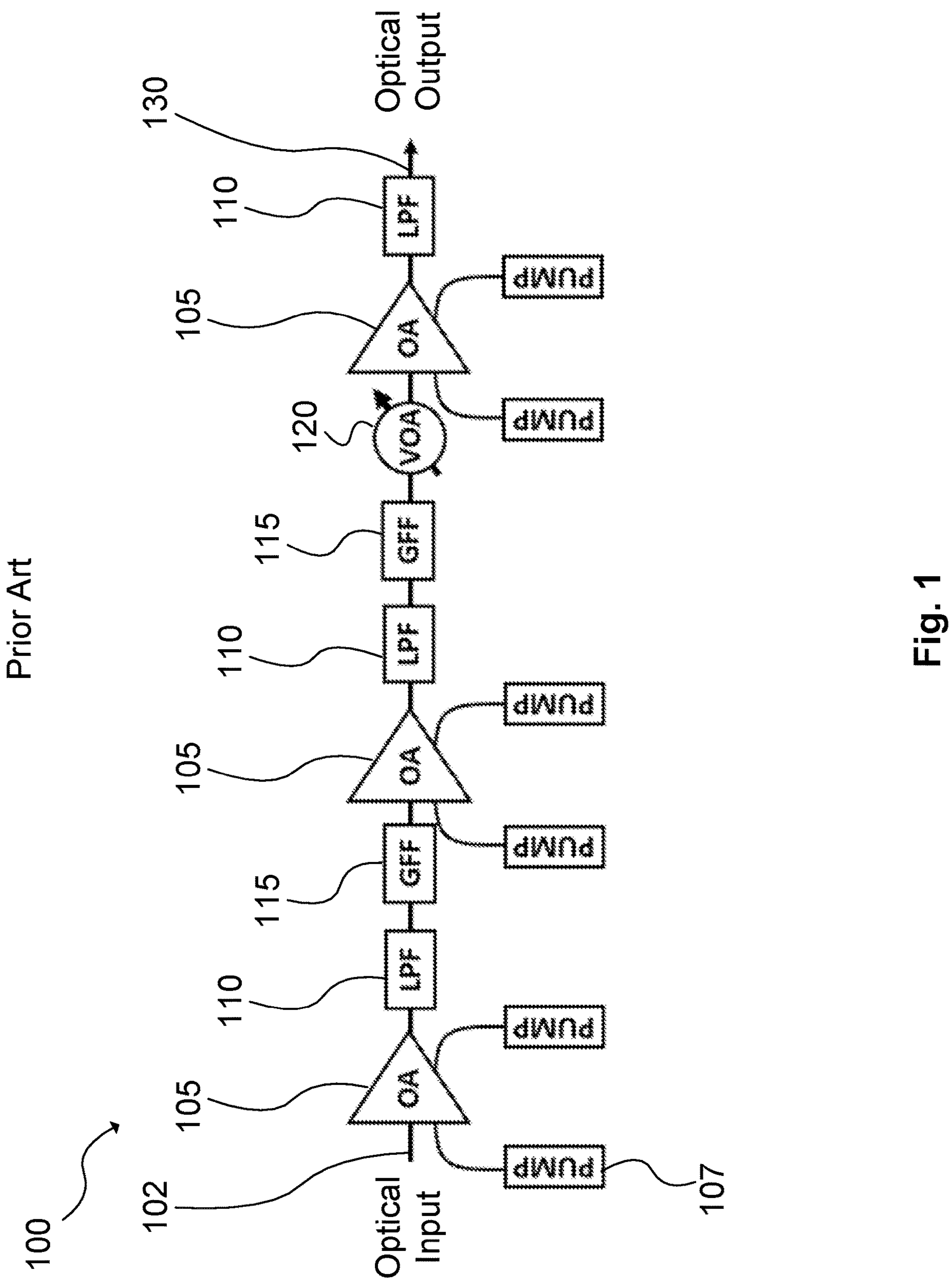
FIG. 1 illustrates a multi-stage L-band erbium-doped fiber amplifier (EDFA), according to prior art.

An erbium-doped optical fiber amplifier (EDFA) works on the principle of stimulated emission where incoming signal photons, i.e. signal light, having a wavelength $\lambda_s$ typically between 1500 nm-1630 nm, are amplified through stimulated emission by erbium ions transitioning from the first excited energy level $^4I_{13/2}$ ($E_1$) to the ground energy level $^4I_{15/2}$ ($E_0$). For efficient amplification to occur, the optical fiber should have a sufficient number of erbium ions that are excited to the energy level ($E_1$), its ion population can be said to be inverted, i.e. there is "population inversion" or simply "inversion", the inversion referring to a significant number of ions being in the $E_1$ state, rather than the $E_0$ state. Population inversion can be achieved by optical pumping where pump photons, i.e. pumping light with a wavelength $\lambda_p$, are sent into the erbium-doped fiber. The pump photons are absorbed by erbium ions in the erbium-doped fiber and enable the transition of erbium ions, either directly or indirectly, from the ground energy level $E_0$ to the first excited level $E_1$, a level where they should remain until stimulated emission occurs due to the interaction with signal photons. Typically, the pump light should possess a wavelength shorter than the signal light, i.e. $\lambda_p<\lambda_s$.

Erbium ions excited to the first energy level $E_1$ can transition to the ground energy level $E_0$ through three mechanisms, i.e. stimulated emission, spontaneous emission and non-radiative relaxation. Stimulated emission, as discussed above, occurs when an ion interacts with an incoming photon having an amount of energy close to the energy difference $\Delta E=E_1-E_0$, and emits a photon identical the incoming photon. Non-radiative relaxation occurs through interaction of the erbium ion with its surroundings and has a negligible contribution in typical EDFAs. As for spontaneous emission, it occurs when an erbium ion spontaneously decays from energy level $E_1$ to energy level $E_0$ by emitting a photon having an energy close to the energy difference $\Delta E=E_1-E_0$. In contrast to stimulated emission, spontaneous emission does not require interaction of the erbium ion with an incoming photon. In a solid host such as glass, photons produced by spontaneous emission can possess a wavelength between 1450 nm and 1650 nm. Photons produced by spontaneous emission can be subsequently amplified through stimulated emission in an EDFA, a phenomenon referred to as amplified spontaneous emission (ASE).

An L-band EDFA can be made of a series of optical amplifiers (OAs) where each OA possesses an erbium-doped fiber that can be designed to have its own ion inversion level, i.e. a different number of inverted ions. The inversion level can more specifically be defined as $n=N_1/N_{tot}$ where $N_1$ is the number of ions in the excited energy level $E_1$ and $N_{tot}$ is the total number of erbium ions.

In order to increase the power conversion efficiency of an L-band EDFA, the EDFA can include multiple segments, each segment corresponding to a separate OA. When an OA provides optical gain by stimulated emission of radiation in the L-band, there is typically significant optical gain in the C-band. A large erbium ion inversion level also contributes to this gain. This in turn allows the growth of strong C-band ASE within the OAs, which reduces the inversion level through optical saturation and deteriorates the overall performance of the L-band EDFA, i.e. the noise figure increases and the PCE decreases.

The C-band ASE radiation however, can be filtered out of the amplified L-band signal. Furthermore, C-band ASE can be subdivided into two wavelength regions, i.e. beneficial C-band ASE and detrimental C-band ASE. Beneficial C-band ASE can be defined as the C-band ASE that possesses a wavelength such that it can act as an optical pump for an OA. In contrast, detrimental C-band ASE possesses a wavelength such that it is amplified by stimulated emission by an OA and therefore contribute to the reduction of the OA's inversion level, as well as the degradation of its L-band optical amplification performance. The wavelength range of beneficial and detrimental C-band ASE is determined by the inversion level of EDFA and its OAs.

In an embodiment reducing power degradation in an L-band EDFA, an EDFA design can include a series of optical amplifiers (OA), each one based on a respective EDF. For example, an EDFA can include three independent OAs, each one containing a given length of EDF, that is powered by one or more pumping sources emitting either in the same direction as L-band optical signals to be amplified (forward pumping) or in the opposite direction (backward pumping). Pumping light can be provided by one or more optical pumping sources such as diode lasers or a fiber laser, which typically operate at around 980 nm, 1480 nm, or both.

In an EDFA made of three OAs, a gain flattening filter (GFF) can be placed after each one of the first and second OA, to allow tailoring of the external gain spectrum generated by each OA, and the EDFA as a whole. A variable optical attenuator (VOA) can be placed after the second OA to enable the EDFA to operate at different nominal gain settings. By placing an optical long-pass filter (LPF) after each one of the first and second OA, C-band ASE can be removed from the amplified L-band signals.

In an embodiment, the inversion level n in the first OA of an EDFA can be higher than that of subsequent OAs. This can allow high gain with a low noise figure to be achieved with a low PCE.

In contrast, in order to meet specific requirements, the subsequent OAs of the EDFA can be designed to operate at lower erbium ion inversion levels (i.e. a lower $N_1/N_{tot}$ ratios). This would allow gain to be provided with a comparatively larger noise figures and a larger PCE. When an OA is further down an EDFA's amplification chain, the impact of the OA's noise figure on the EDFA's total noise figure is reduced and therefore, an EDFA composed of several, differently adjusted OAs, is more adjustable in terms of its gain, noise figure and PCE.

FIG. 1 illustrates a multi-stage L-band erbium-doped fiber amplifier (EDFA), according to prior art. An optical input 102 is amplified with three successive and independent OAs 105. Each OA 105 is powered with one or more sources (pump) 107 of pumping light, propagating either forward or backward in the EDFA. A gain flattening filter (GFF) 115 is located after each of the first and second OAs, in order to tailor their respective output spectra. To allow operation at different nominal gain settings, a variable optical attenuator (VOA) 120 is placed after the second OA. After each OA 105, there is a long-pass filter (LPF) 110 for removing C-band ASEs, from amplified L-band signals. Optical output 130 resulting from these operations includes amplified L-band signals and little to no C-band radiation.

The internal architecture of an OA 105 can include an erbium-doped fiber (EDF) enabling amplification of optical signals in the range between 1500 nm and 1630 nm. An OA can also include one or more wavelength division multiplexers (WDM) to allow both signal and pumping light to be coupled into the EDF. Several WDMs can be used within an OA in order to couple different pumping lights are provided to the OA. Optical isolators (ISO) can be located at the input and output of the OA, in order to prevent performance degradation of the EDFA by various phenomena, such as build-up of counter-propagating ASE, parasitic lasing and multipath interference.

Figure 2:
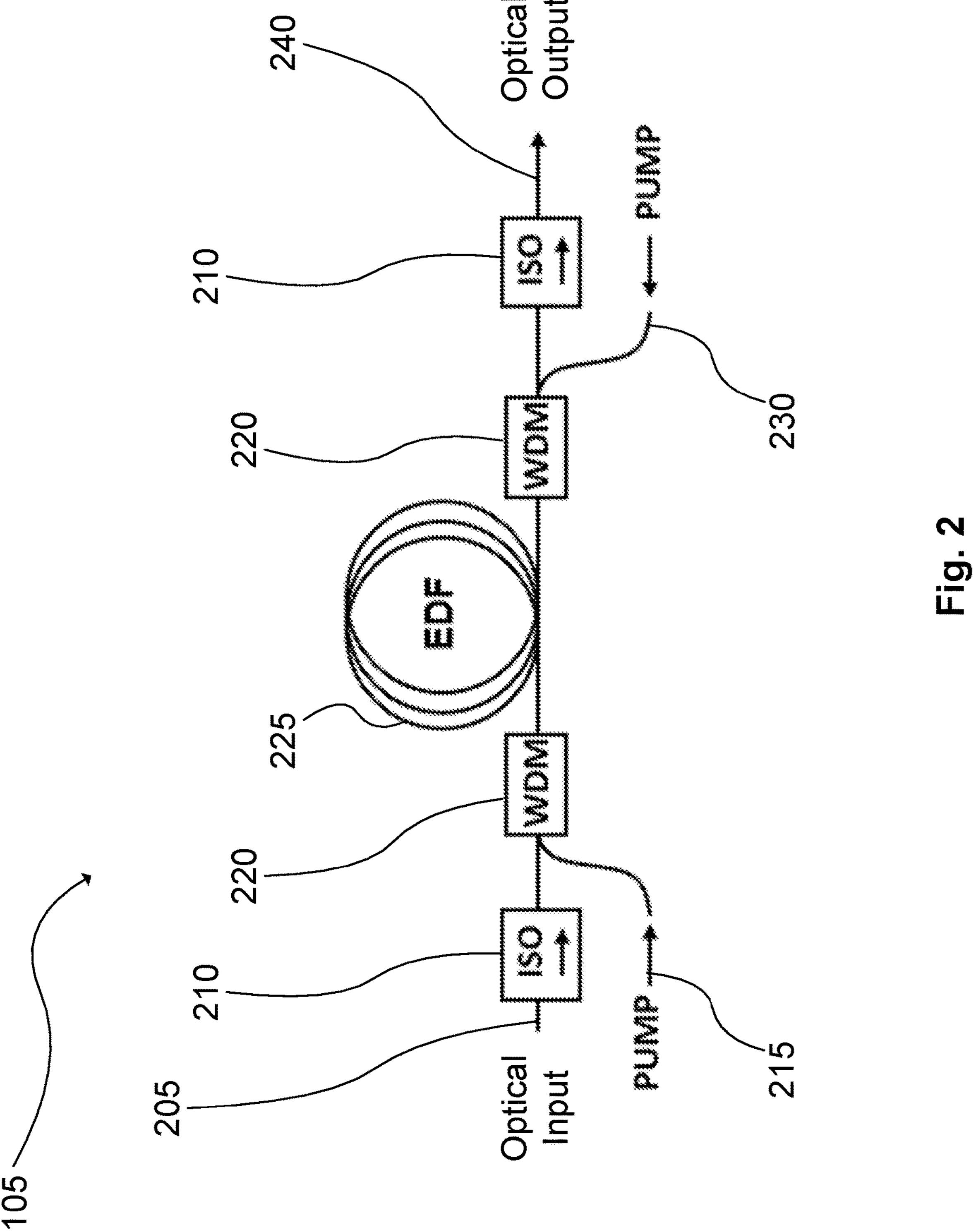
FIG. 2 illustrates the internal architecture of an optical amplifier (OA) stage, as included in a multi-stage extended L-band EDFA, according to embodiments.

FIG. 2 illustrates the internal architecture of an optical amplifier (OA) stage, as included in a multi-stage L-band EDFA according to embodiments. An optical input 205 can pass through an optical isolator 210 that prevents processed input light from exiting backwards and returning to contaminate previous operations. Pumping light 215 can join the input light 205 at a wavelength division multiplexer (WDM, which can also represent a demultiplexer, depending on location) 220, such as to cause an inversion level, i.e. a $N_1/N_{tot}$ ratio that is sufficient to facilitate stimulated emission of radiation, in the erbium-doped fiber (EDF) 225, as required for signal amplification. If required, another source of pumping light 230 can enter the EDF 225 via another WDM 220 propagating the pumping light 230 backwards. Another ISO 210 can prevent externally processed light from entering the system backwards, while allowing the forward propagating amplified signal to exit as an output signal 240.

In an embodiment, a three-stage L-band EDFA 100 can be designed to provide over 30 dB of nominal external gain $G_{ext}$ in the range of wavelengths between 1575 nm and 1626 nm range (L-band).

As measured between its optical input 102 and optical output 130, the external gain spectrum $G_{ext}(\lambda)$ of an EDFA 100, in a dB scale, can be defined as:

$$G_{ext}(\lambda) = G_{int}(\lambda) - L(\lambda)$$

where $G_{int}(\lambda)$ is the EDFA's internal gain spectrum, and $L(\lambda)$ is the combined loss spectrum of all the passive components (GFFs, WDMs, ISOs, LPFs, etc.) and OAs composing the EDFA 100.

As an example, for an EDFA 100 designed to provide gain in a range of wavelengths between 1575 nm to 1626 nm (L-band), the internal gain $G_{int}(\lambda)$ in the L-band wavelength range can typically vary from 35 dB to 60 dB.

Along with the internal gain $G_{int}(\lambda)$ in the L-band, there can also be significant internal gain in the C-band, i.e. between 1550 nm and 1575 nm. This range is outside of the useful L-band amplification range, and it can be referred to as detrimental C-band ASE.

Figure 3:
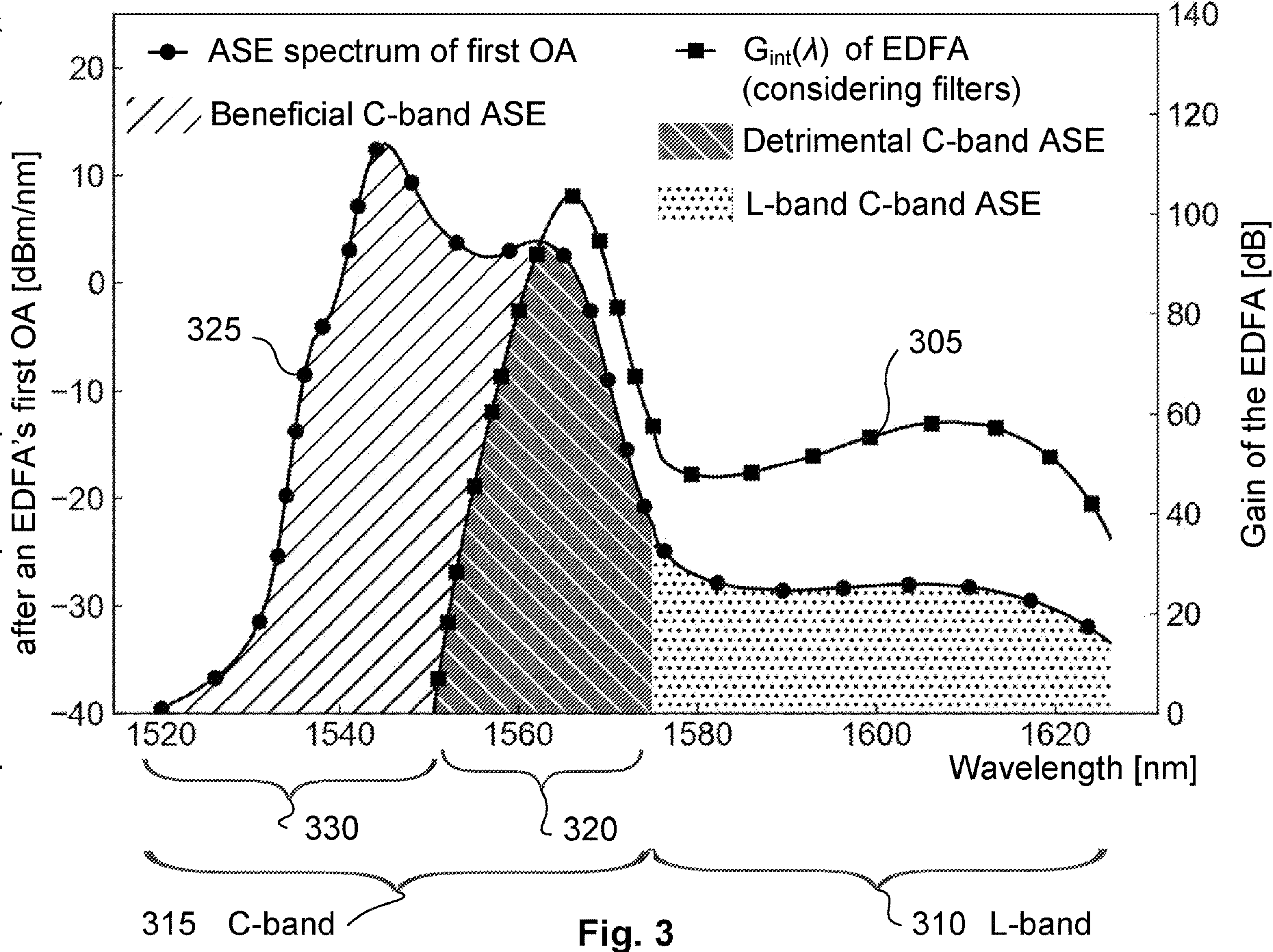
FIG. 3 includes the internal gain spectrum $G_{int}(\lambda)$ of an L-band EDFA composed of three OA stages, as well as the spectrum of amplified spontaneous emission (ASE) of the EDFA's first OA stage, according to embodiments.

FIG. 3 illustrates the internal gain spectrum $G_{int}(\lambda)$ of a three-stage L-band EDFA, according to an embodiment. The internal gain spectrum $G_{int}(\lambda)$ 305 shows amplification in the L-band 310 as desired, but also in part of the C-band 315, between 1550 nm and 1575 nm 320, i.e. outside the useful L-band amplification range.

FIG. 3 also shows the spectrum of amplified spontaneous emission after the EDFA's first OA stage 325, according to an embodiment. The OA's ASE spectrum 325 includes both C-band ASE315, i.e. between 1530 nm and 1575 nm, and L-band ASE, i.e. between 1575 nm and 1630 nm. This is because in order to reduce the noise figure of the EDFA, the first OA stage operates at a high inversion level of erbium ions, which results in the generation of significant ASE in the C-band. Incidentally, other OAs in the EDFA can also produce a similar C-band ASE spectrum.

A large portion of the OA's ASE spectrum 325 overlaps with the C-band portion 320 of the internal gain spectrum $G_{int}(\lambda)$ 305. The C-band portion 320 of this overlap can be referred to as the detrimental C-band ASE spectrum 320. If no filter 110 was used between the separate OA stages 105, the detrimental C-band portion 320 would be further amplified by the later OA stages 105 of the EDFA. This optical power could rapidly increase, eventually saturate the later OA stages, and degrade the overall performance of the EDFA 100. In particular, the EDFA's noise figure would increase, the external gain $G_{ext}(\lambda)$ would decrease, and the pump power consumption required to achieve the desired external gain $G_{ext}(\lambda)$ would increase.

The wavelengths of the first OA's ASE spectrum 325, where the internal gain spectrum $G_{int}$ ($\lambda$) 305 is less than zero, i.e. wavelengths less 330 than 1550 nm, do not get amplified by further OAs of the EDFA. However, these wavelengths 330 can instead be used to pump subsequent OA stages and can therefore be referred to as beneficial C-band ASE. If used as such these wavelengths 330 can be referred to as the beneficial C-band ASE spectrum 330.

An optical long-pass filter (LPF) 110, as used in a multi-stage L-band EDFA 100, can have a spectrum with a cut-off frequency $\lambda_{off}$ below which optical wavelengths are transmitted with low loss, and above which optical wavelengths are strongly absorbed or attenuated such as to allow essentially no transmission. Because the slope between the transmitted portion and the attenuated portion of the spectrum is not sudden, the cut-off frequency $\lambda_{off}$ is typically defined as the wavelength at which the loss value is half the maximum transmission value.

Figure 4:
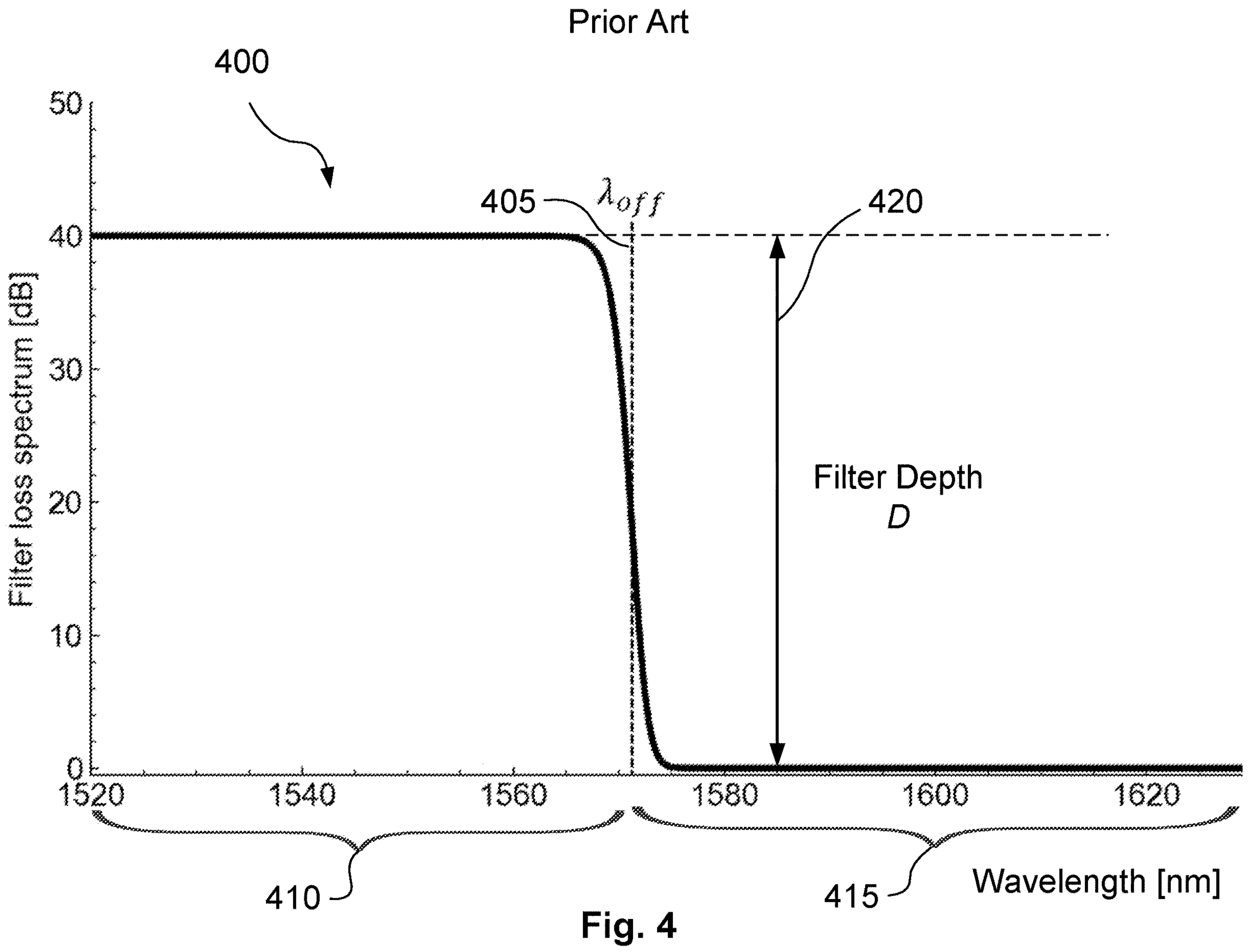
FIG. 4 is the loss spectrum of an optical long-pass filter (LPF).

FIG. 4 is a loss spectrum for an optical long-pass filter (LPF), as can be used in a multi-stage L-band EDFA, according to prior art. An LPF loss spectrum 400 includes two distinct spectral regions that are delimited by a cut-off wavelength $\lambda_{off}$ 405. The portion 410 of the loss spectrum less than $\lambda_{off}$ 405 is characterized by a low loss value, typically less than 1 dB, and possibly 0 dB, which is suitable for the transmission of L-band optical signals. In contrast, the portion 415 of the loss spectrum greater than $\lambda_{off}$ 405, the LPF loss spectrum is characterized by a significant filter depth value (D) 420 for the loss.

Typical values for parameters $\lambda_{off}$ and D are $\lambda_{off}$=1572 nm and D=40 dB. However, a person of ordinary skill in the art can acknowledge that in an L-band EDFA, an LPF can be selected to have a cut-off wavelength $\lambda_{off}$ 405 and a filter depth D 420 that are based on the application scenario and performance requirements of the EDFA.

In order to reduce the power consumption of optical pumps in a multi-stage extended L-band EDFA, embodiments of the present disclosure include the installation of at least one optical band stop filter (BSF), between at least two OA stages composing the EDFA. By including a BSF instead of an LFP, a beneficial C-band ASE spectrum 330 can be propagated to pump further OA, instead of being unused. More generally, each BSF can filter out detrimental C-band ASE 320 generated by a first OA, prior to the C-band ASE being directed towards a second OA, while allowing beneficial C-band ASE 330 to be propagated to pump at least one other OA. The propagation of beneficial C-band ASE 330 to pump at one other OA allows use of available optical pumping power, instead of it being lost, and can therefore reduce the power consumption of original pumping sources 107, or increase the overall PCE of an EDFA.

An L-band EDFA according to embodiments can be composed of three independent OAs that are separated by BSFs. The EDFA can also contain other components enabling it to function properly and emit a desired optical output. Although a BSF between two OA stages can take the place of an LPF, an LPF located at the output of the EDFA, after the last OA, should not be replaced by a BSF, because the optical output of the EDFA should be filtered from C-band light.

Figure 5:
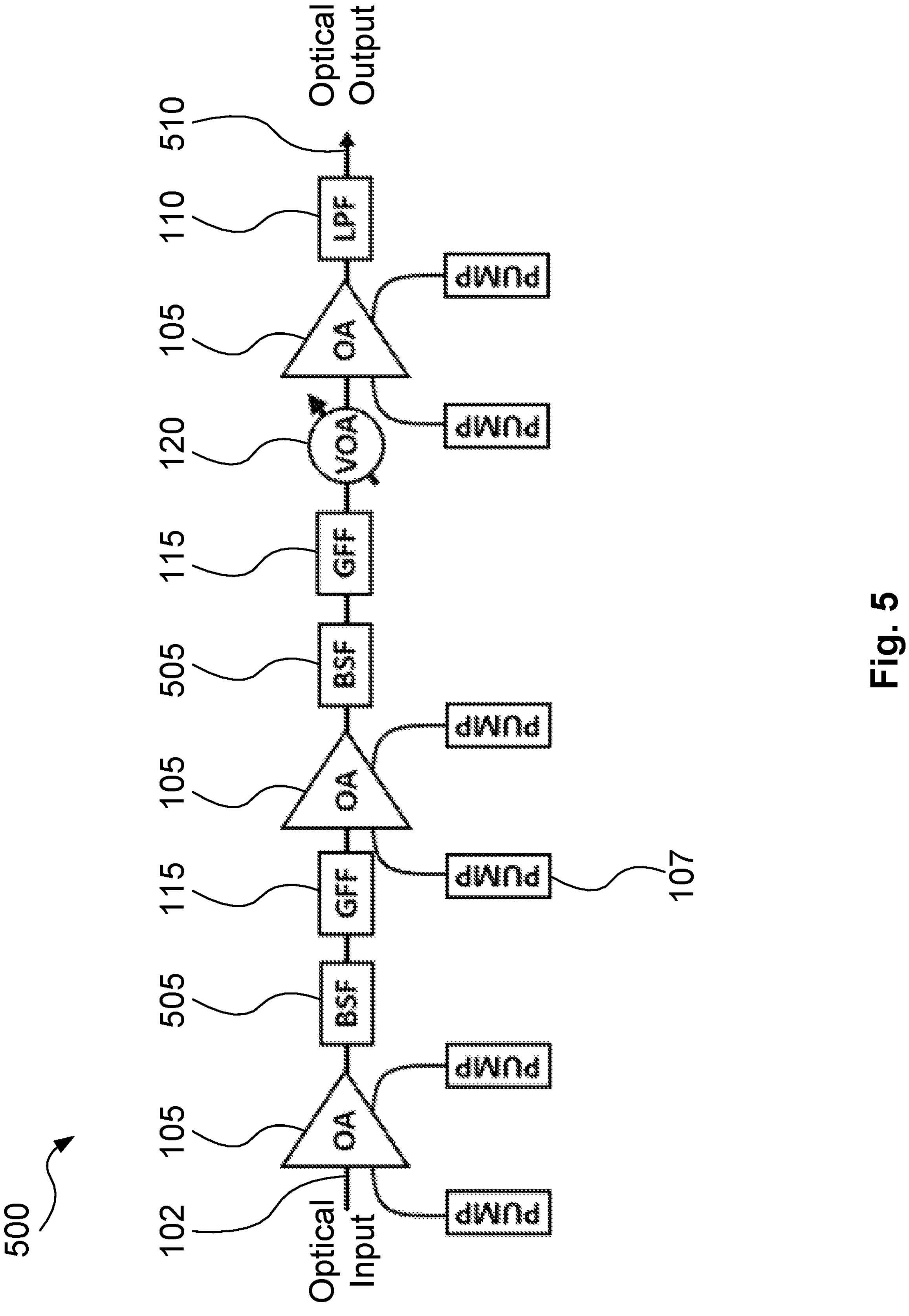
FIG. 5 illustrates a multi-stage L-band EDFA, according to an embodiment.

FIG. 5 illustrates an L-band EDFA, according to an embodiment. The EDFA 500 is composed of three independent OAs 105 interspaced with band stop filters (BSF) 505. The EDFA also contain components required to function properly, such as a gain flattening filter (GFF) 115 after each BSF, and a variable optical attenuator (VOA) 120 before the third OA. A low-pass filter (LPF) 110 is located at the output of the EDFA in order to filter out any C-band. The optical output 510 contains amplified L-band signals, as well as L-band ASE, and little to nothing else. Optical pumps 107 can provide optical pumping light to make the erbium ions of an OA's EDF transition from the ground energy level $E_0$ to the excited energy level $E_1$, in preparation for amplification by stimulated emission.

The loss spectrum of a BSF according to embodiments can include three distinct regions, delimited by the BSF's cut-on wavelength $\lambda_{on}$ and cut-off wavelength $\lambda_{off}$. For wavelengths below $\lambda_{on}$ and wavelengths greater than $\lambda_{off}$, the spectral regions can be characterized by a loss value that is less than 1 dB, and as low as 0 dB, whereas the spectral region between $\lambda_{on}$ and $\lambda_{off}$ can be characterized by a filter depth value D. A BSF can also be characterized by the full-width at half maximum (FWHM) of the spectral region between $\lambda_{on}$ and $\lambda_{off}$, which can be defined as the difference between the cut-on wavelength and the cut-off wavelength:

$$FWHM = \lambda_{off} - \lambda_{on}$$

where the cut-on wavelength $\Delta_{on}$ corresponds to a loss being at 50% of a maximum loss on a decibel scale, and the cut-off wavelengths $\lambda_{off}$ corresponds to a loss being at 50% of a maximum loss on a decibel scale.

Typical values for BSF parameters are $\lambda_{on}$=1549 nm, $\lambda_{off}$=1571 nm, FWHM=22 nm, and D=40 dB. However, for reasons apparent to a person of ordinary skill in the art, values of BSF parameters according to embodiments can deviate from these values.

Figure 6:
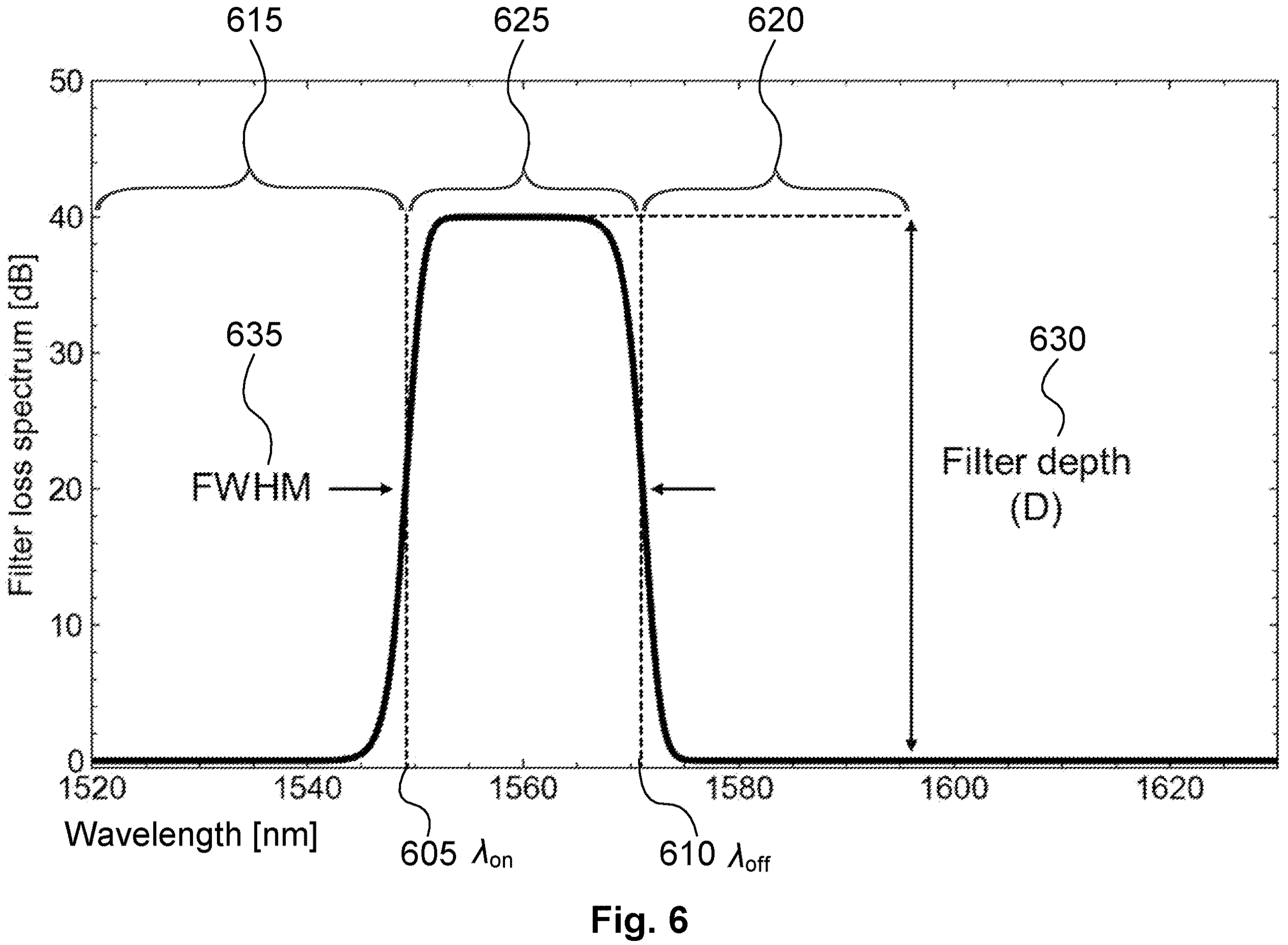
FIG. 6 is the loss spectrum of a band-stop filter (BSF), according to an embodiment.

FIG. 6 illustrates the loss spectrum of a BSF, according to an embodiment. The BSF loss spectrum possesses three distinct spectral regions that are delimited by the BSF's cut-on ($\lambda_{on}$) wavelength 605 and the BSF's cut-off ($\lambda_{off}$) wavelengths 610. For the region 615 below $\lambda_{on}$, and the region 620 over $\lambda_{off}$, the BSF loss spectrum is characterized by a loss value that is less than 1 dB and possibly 0 dB, whereas for wavelengths in the region 625 between $\Delta_{on}$ and $\lambda_{off}$, the BSF loss spectrum is characterized by a filter depth value D 630. The BSF can also be characterized by a FWHM 635.

Referring to FIG. 3 and FIG. 6, it should be apparent to a person of ordinary skill in the art that the use of BSFs 505 after the first and second OAs 105 of an EDFA as shown in FIG. 5, can reduce the EDFA's overall power consumption. The BSFs 505 prevent detrimental C-band ASE that is generated in the first and second OAs 105, as shown in FIG. 3, from respectively propagating into the second and third OAs 105, and from deteriorating their performance. Further, in contrast to prior art, the BSFs 505 allow for beneficial C-band ASE generated in the first and second OAs to respectively propagate into the second and third OAs, and to contribute to the optical pumping of these OAs. This optical pumping power, which is added to the optical pumping power from base pumping sources 107, allows a reduction in the optical pumping power consumption from the base pumping sources 107 for the second and third OAs 105. This in turn can reduce the overall power consumption of the EDFA 500 as a whole.

In an L-band EDFA according to embodiments, the characteristics of a BSF 505 can change depending on the design and requirements of the remaining portions of the EDFA 500 containing it. Specifically, the cut-off wavelength $\lambda_{off}$ 610 can be chosen so that the BSF 505 induces minimal losses in the signal band, i.e. the L-band wavelengths. The cut-off wavelength $\lambda_{off}$ 610 can therefore be located in the range of wavelengths between 1560 nm and 1575 nm. The cut-on wavelength $\lambda_{on}$ 605 can be in the vicinity of a wavelength where the internal gain of the EDFA is equal to or less than zero. In the case of FIG. 3, this is approximately 1550 nm. The cut-on wavelength $\lambda_{on}$ 605 should always be lower than $\lambda_{off}$. In general, the cut-on wavelength $\lambda_{on}$ 605 can be between 1520 nm and $\lambda_{off}$ 610. In order to ensure proper filtering of detrimental C-band ASE, the filter depth D 630 of the BSF can be greater than 30 dB, but less optimal depths greater than 10 dB can also be used.

Figure 7:
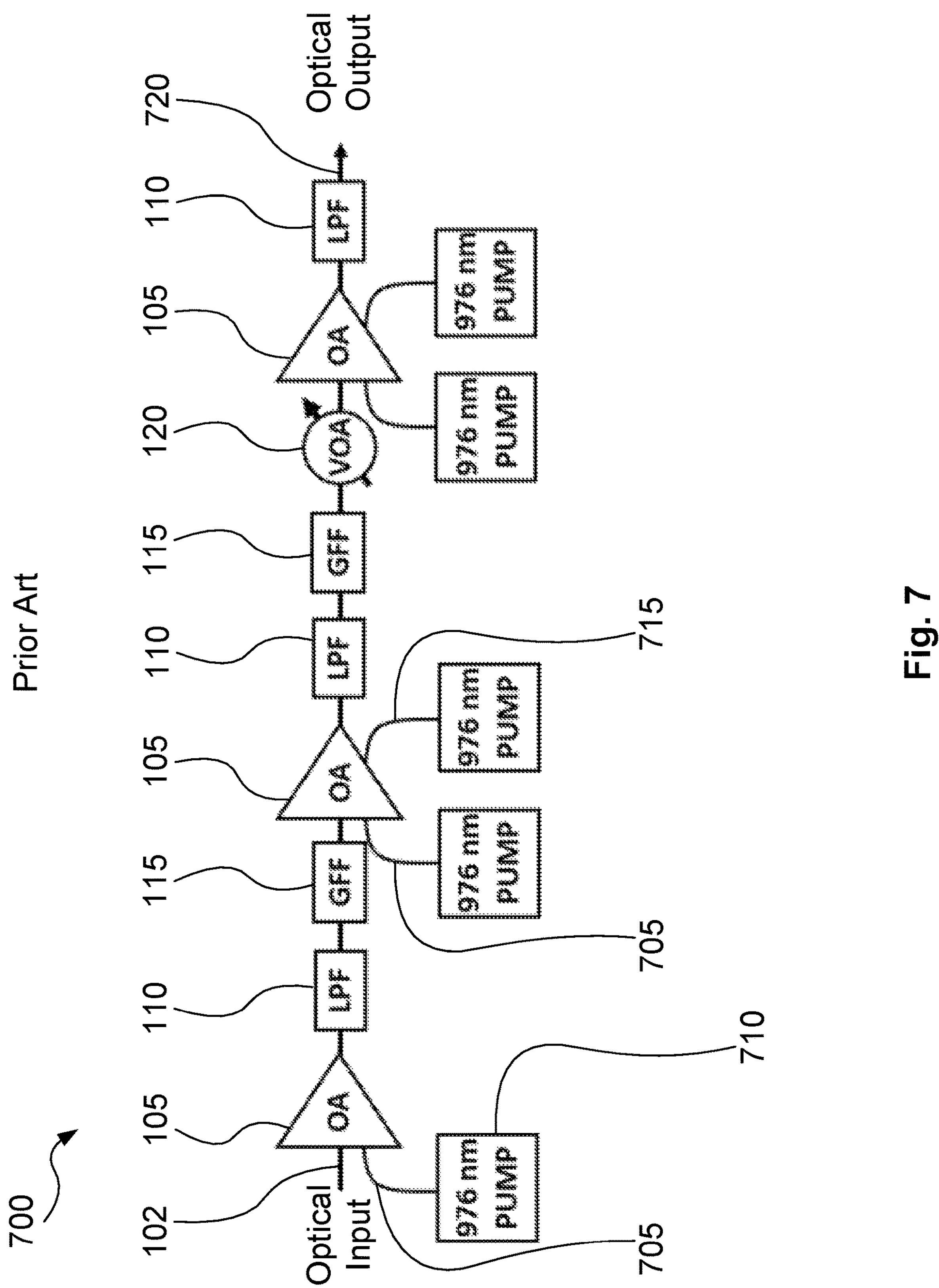
FIG. 7 illustrates a multi-stage L-band EDFA according to a first design D1, where the first OA stage is optically pumped in the forward direction by one source, according to prior art.
Figure 8:
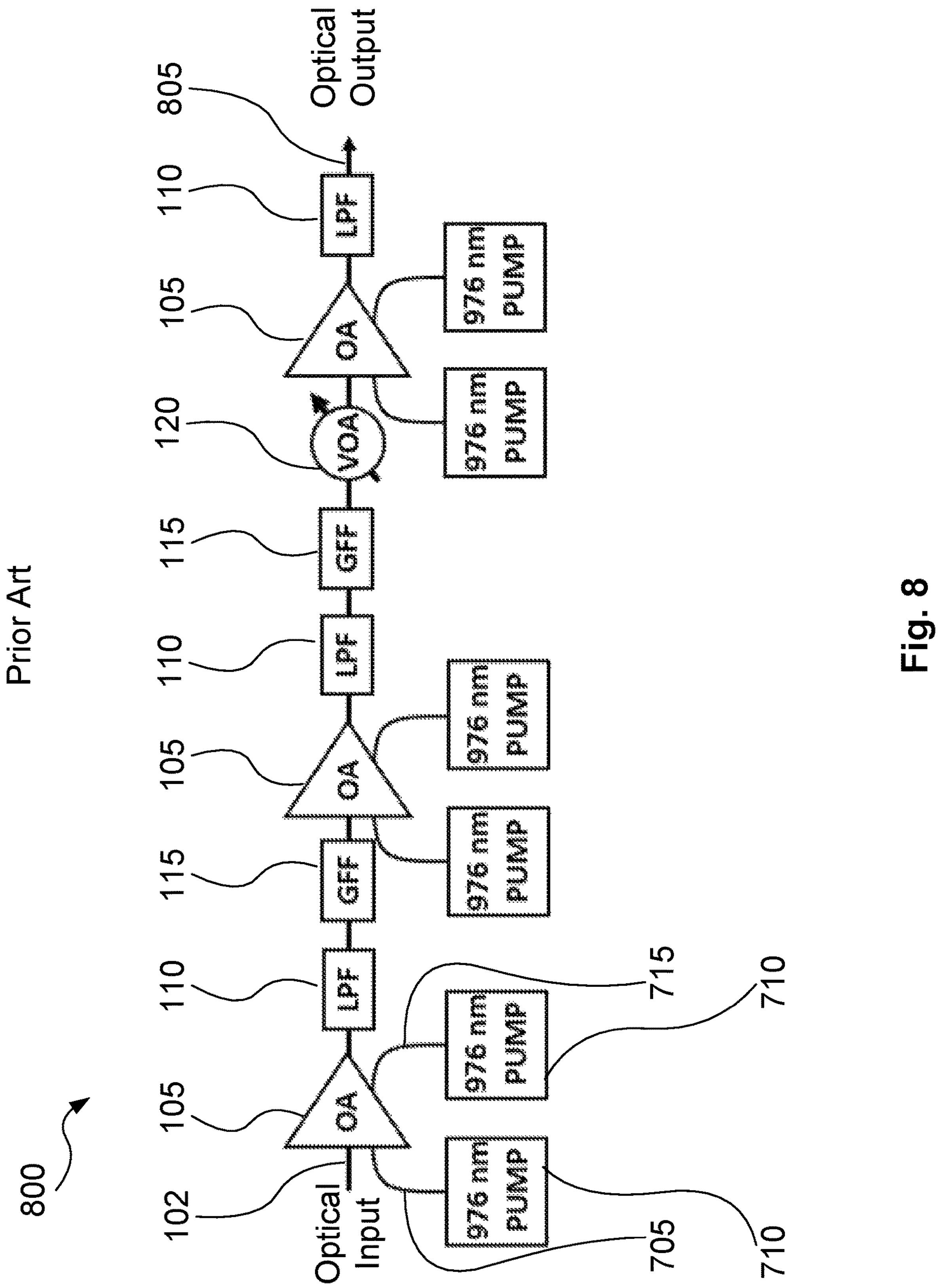
FIG. 8 illustrates a multi-stage L-band EDFA according to a second design D2, where the first OA stage is optically pumped in a bidirectional manner by two sources, according to prior art.
Figure 9:
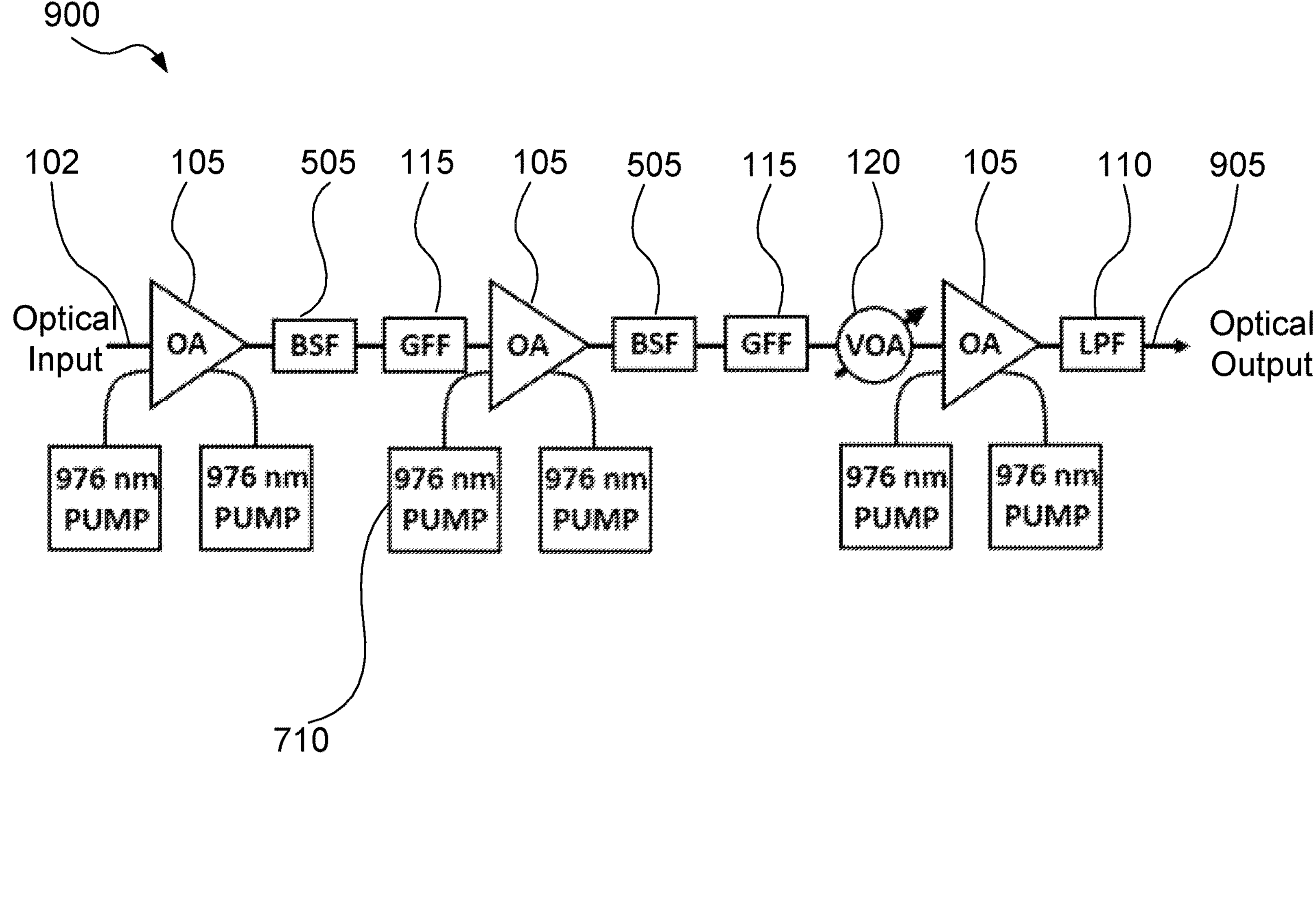
FIG. 9 illustrates a multi-stage L-band EDFA according to a third design D3, where the optical outputs of the first and second OA stages are filtered by respective stop-band filters, and where the first OA stage is optically pumped in a bidirectional manner by two sources according to an embodiment.

The effectiveness of installing BSFs to an EDFA according to embodiments, in reducing the consumption of optical pumping power, while maintaining an overall noise figure below a certain pre-determined threshold, can be shown by comparing the performance of three different designs for L-band EDFAs. FIG. 7, FIG. 8 and FIG. 9 illustrate three different L-band EDFA designs that can be compared.

A first EDFA design D1 is characterized by using forward pumping at 976 nm in a first OA, and using bi-directional pumping (forward and backward pumping) at 976 nm in a second OA and a third OA. Further, each OA is followed by an LPF 110.

FIG. 7 illustrates a multi-stage L-band EDFA according to a first design D1, where the first OA stage is optically pumped in the forward direction by one source, according to prior art. The design D1 700 is similar to that of FIG. 1, except that the configuration of optical pumping sources is set to include forward pumping 705 with a 976 nm pumping source 710 at the first OA 105, and both forward 705 and backward pumping 715 with respective 976 nm pumping sources 710 at each other OA 105. Each OA is followed by an LPF 110. Other components include gain flattening GFFs 115 and a variable optical amplifier (VOA) 120. The optical output 720 of design D1 700 can be compared to optical output 805 of design D2 800 and optical output 905 of design D3 900.

A second EDFA design D2 is characterized by using bi-directional pumping at 976 nm for its first, second and third OAs. Both designs D1 and D2 employ LPFs after the first and second OAs.

FIG. 8 illustrates a multi-stage L-band EDFA according to a second design D2, where the first OA stage is optically pumped in a bidirectional manner by two sources, according to prior art. This design D2 800 is similar to design D1 700, except that the optical pumping configuration further includes backward pumping 715 with a respective 976 nm optical sources 710 at the first OA 105. Each OA is followed by an LPF 110. Other components include gain flattening filters 115 before each OA, and a variable optical amplifier 120 before the third OA. The optical output 805 of design D1 can be compared to the optical output 720 of design D1 700 and the optical output of design D3 900.

A third EDFA design D3 is also characterized by using bi-directional pumping with 976 nm pumping light at each OAs, but instead of using LPFs 110 after the first and second OAs, it uses BSFs 505, according to embodiments.

FIG. 9 illustrates a multi-stage L-band EDFA according to a third design D3, where the optical outputs of the first and second OA stages are filtered by respective stop-band filters, and where the first OA stage is optically pumped in a bidirectional manner by two sources, according to an embodiment. The optical pumping configuration is similar to design D2 800, but instead of using LPFs 110 after the first and second OAs, design D3 900 uses BSFs 505. It also includes an LPF 110 after the third OA 105. Other components include gain flattening filters (GFF) 115 before each OA 105, and a variable optical amplifier (VOA) 120 before the third OA. The optical output 905 of design D3 900 can be compared to the optical output 720 of design D1 700, and the optical output 805 of design D2 800.

When comparing designs D1 700, D2 800 and D3 900, it can be ensured that for each design, the maximum noise figure (NF) does not exceed a set limit $NF_{lim}$, such as $NF_{lim}$=7.31 dB for example, and that the total pumping power, at 976 nm for example, consumed by each EDFA is minimized. To do so, the depth and shape of each GFF's 115 transmission spectrum, and the lengths of the EDF 225 in each OA 105, can be optimized independently, in order for each EDFA to have a desired external gain spectrum $G_{ext}(\lambda)$. The pump power provided by each external pump source can also be optimized simultaneously. As an example, a desired or selected external gain spectrum $G_{ext}(\lambda)$ for each EDFA D1, D2 and D3, can be characterized by a nominal value of 32 dB and a slope of −0.035 dB/nm, over a range of wavelengths between 1575 nm and 1526.2 nm.

Figure 10:
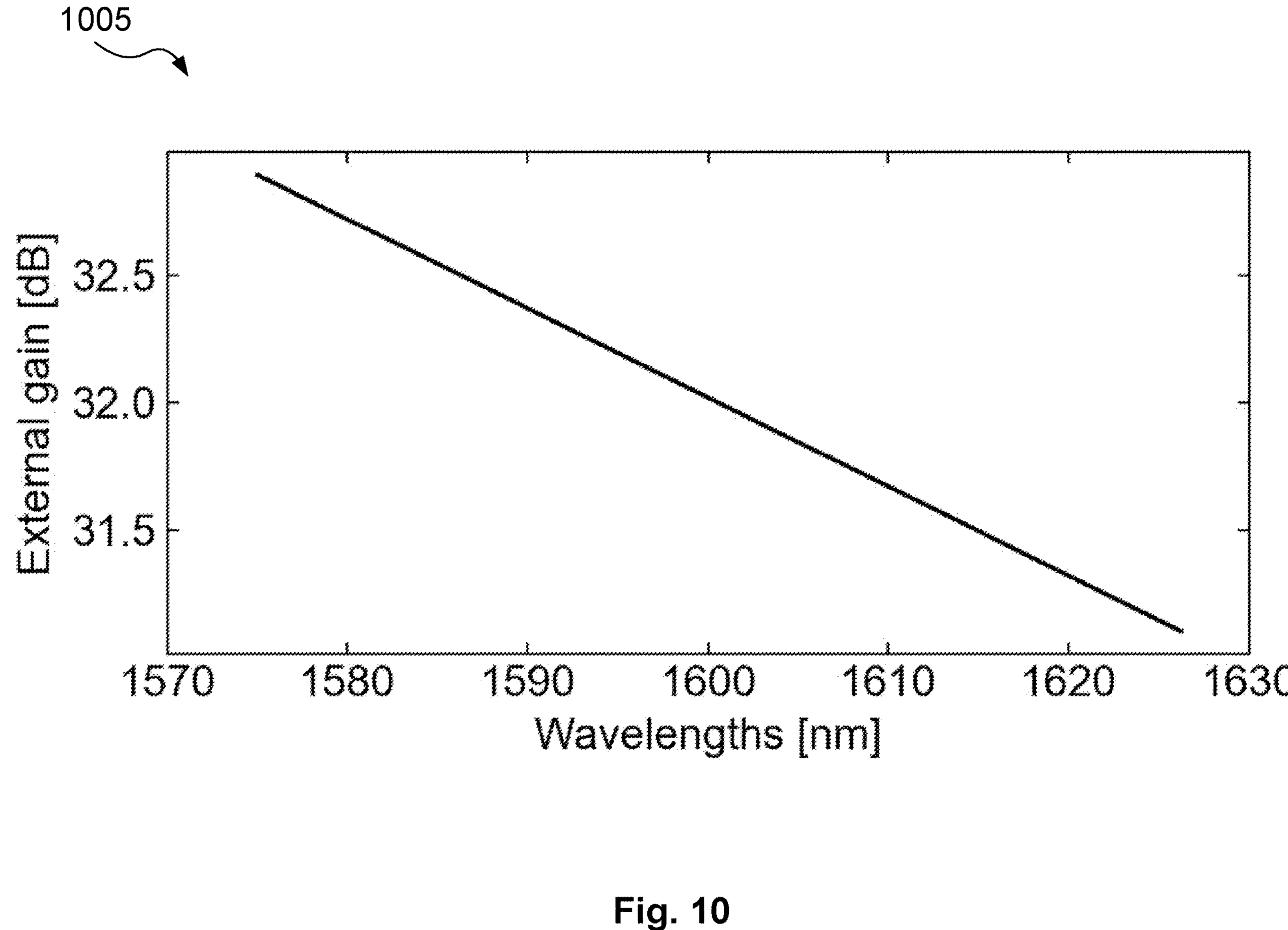
FIG. 10 shows a target external gain spectrum $G_{ext}(\lambda)$ for three EDFA designs, so that they can be compared and an embodiment can be evaluated.

FIG. 10 shows a target external gain spectrum $G_{ext}(\lambda)$ for designs D1 700, D2 800 and D3 900, so that they can be compared and an embodiment can be evaluated. The target gain spectrum $G_{ext}(\lambda)$ 1005 is characterized by a nominal value of 32 dB and a slope of −0.035 dB/nm over the spectral range between 1575 nm and 1626.2 nm. The optical input's power spectrum includes 120 channels of equal power, evenly distributed in the range between 1575 nm and 1626.2 nm, and the total power is −9.5 dBm. For each design, the total power of optical output is 22.5 dBm.

The performance of the different EDFA designs D1, D2 and D3 can be compared with a table such as Table 1.

TABLE 1

Characteristics of the EDFA designs as well as their performance

| | EDFA design | | |
|---|---|---|---|
| | D1 (Prior Art) | D2 (Prior Art) | D3 (Embodiment) |
| Filters | LPF-LPF-LPF | LPF-LPF-LPF | BSF-BSF-LPF |
| Pumping configuration for 1$^{st}$ OA | Forward | Bi-directional | Bi-directional |
| Total pumping power consumption (mW) | 2567 | 2268 | 1500 |
| Reduction in power consumption with respect to D1 (%) | — | 11.6 | 41.6 |
| Maximum noise figure (dB) | 7.26 | 7.28 | 7.31 |
| Average noise figure (dB) | 6.46 | 6.46 | 6.97 |
| Total length of 1$^{st}$ OA's EDF (m) | 66.4 | 63.7 | 60.7 |

In Table 1, it can be seen that design D3 enables a power consumption (1500 mW) that is significantly lower than the power consumption of D1 (2567 mW) and D2 (2268 mW). More specifically, the power consumption of design D3 is more than 40% lower than that of design D1 (i.e. ~58% of D1's power consumption).

The maximum noise figure is nearly identical for every design and lies between 7.26 dB and 7.31 dB, i.e. lower or equal to the noise figure limit of 7.31 dB set beforehand. As for the average of the noise figure value at every wavelength (i.e. the average noise figure), it is the same for designs D1 and D2 at 6.46 dB, whereas for design D3, it is 6.97 dB.

By comparing the total power consumptions with the average noise figures, a trade-off between the two can be seen, because although design D3 has a greater reduction in power consumption, it comes at the expense of a greater average noise figure.

Finally, Table 1 also shows that the total EDF length of 60.7 m for design D3 is slightly shorter than those of 66.4 m and 63.7 m for designs D1 and D2, respectively. This reduction in EDF length is an added benefit of an embodiment because a long EDF length can be a significant hurdle to reducing the footprint of an L-band EDFA, and integrating it into a small-form pluggable package.

In an EDFA according to embodiments, there can be a trade-off between the EDFA's average noise figure and the power consumption of its optical pumping sources.

Figure 11:
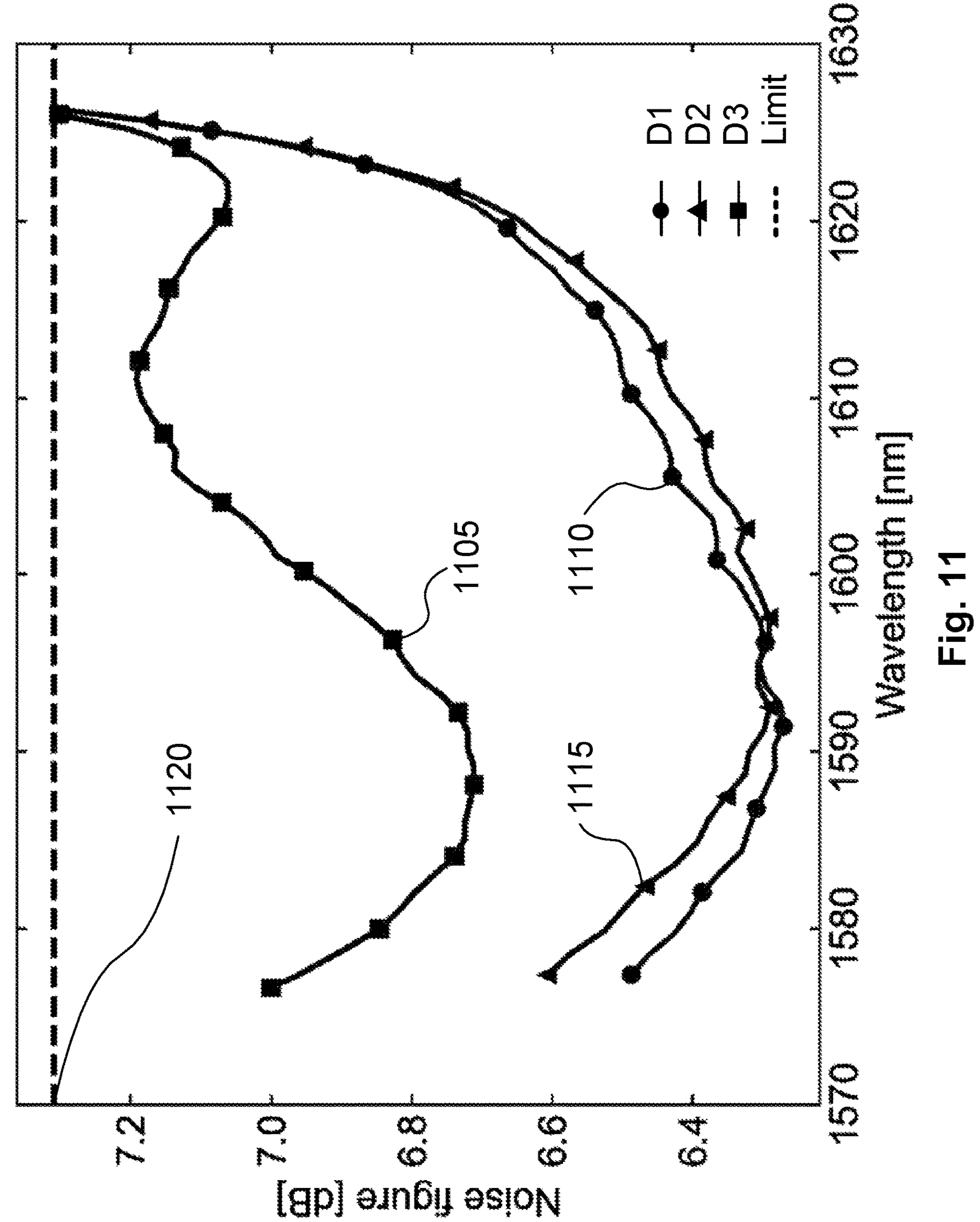
FIG. 11 is a noise figure spectrum for EDFA designs D1 and D2, as well as D3 according to an embodiment.

FIG. 11 is a graph showing the noise figure spectrum of EDFA design D3 900, according to an embodiment, as well as those of designs D1 and D2. The noise figure spectrum 1105 of design D3 900 includes generally greater noise figures than the D1 noise figure spectrum 1110 and the D2 noise figure spectrum 1115. This is because although BSFs 505 allow the propagation of beneficial C-band ASE 330 as additional pumping power to other OAs, it comes with the trade-off of causing an increased noise figure as well. The noise figure is nevertheless maintained below a certain pre-determined limit, which in this case is $NF_{lim}$=7.31 dB 1120. Therefore, as long as the noise figure is maintained below the pre-determined limit $NF_{lim}$, the BSFs 505 can be included in the EDFA to allow a reduction in pumping power consumption.

The trade-off in power consumption and average noise figure for EDFA designs D1, D2 and D3 can be investigated further by graphically comparing power consumption data and average noise figures.

Figures 12A, 12B:
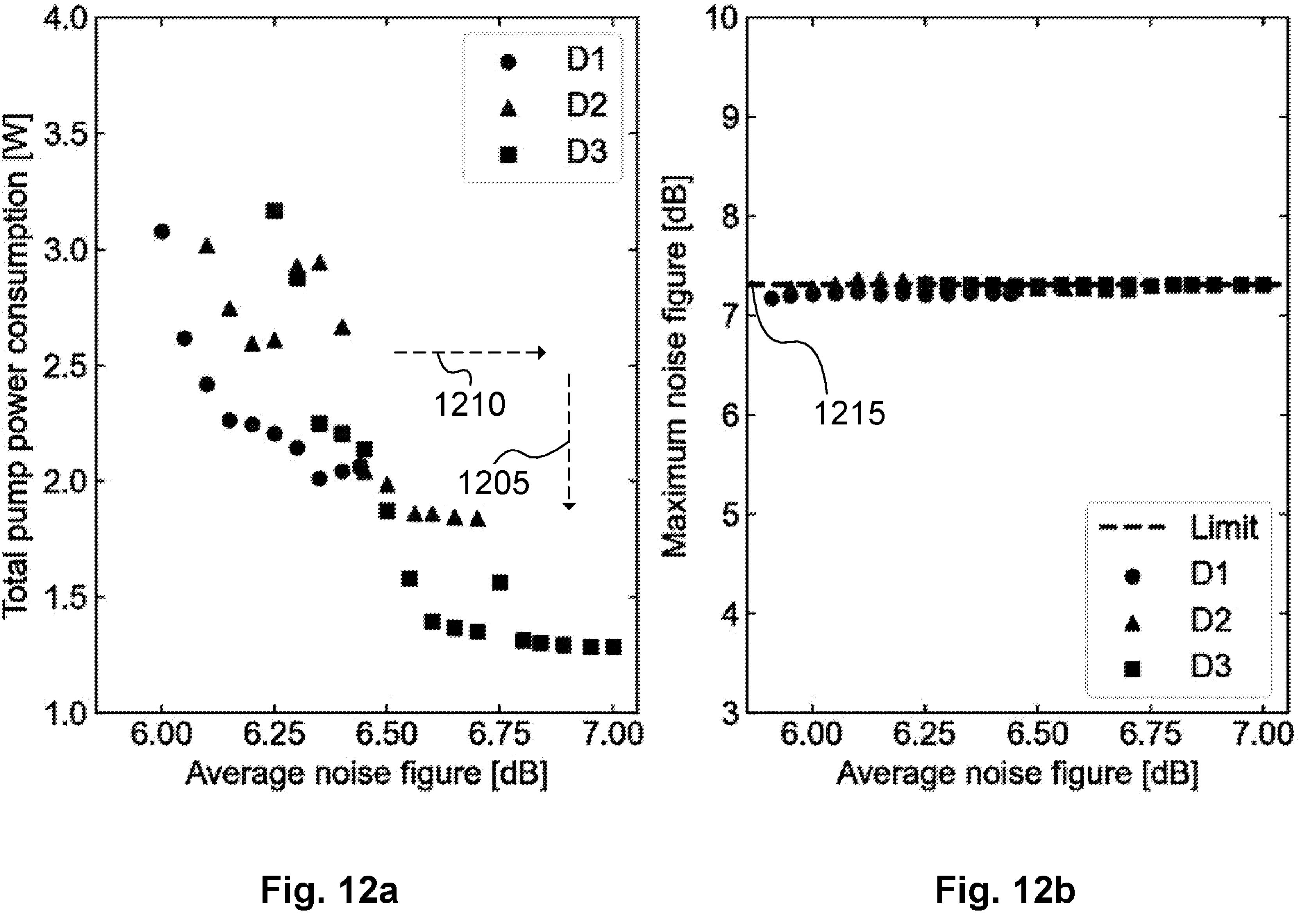
FIG. 12*a* is a graph showing, for three EDFA designs D1, D2 and D3 according to embodiments, the EDFA's consumption of external optical pumping power, as a function of its average noise figure.
FIG. 12*b* is a graph showing, the maximum noise figure as a function of average noise figure, for optimized versions of EDFA design D1, D2, as well as for an EDFA design D3 according to an embodiment.

FIG. 12*a* is a graph showing, for each EDFA design D1, D2 and D3 according to embodiments, the EDFA's consumption of external optical pumping power, as a function of its average noise figure. For each EDFA design, the total power consumption of external pumping was reduced as much as it could by optimizing the transmission spectrum of GFFs 115, the length of EDFs 225, and the power of each pumping source 710, in each OA, without the noise figure being raised above a pre-determined limit $NF_{lim}$. The parameters of embodiments underlying FIG. 12*a* are not necessarily the same as those for embodiments in Table 1 and FIG. 11.

For each EDFA design, the total pumping power consumption can be reduced 1205 by allowing the average noise figure to increase 1210. However, this compromise cannot be sustained up to arbitrarily large average noise figures, because there is a threshold average noise figure above which the maximum noise figure of the OA would exceed the noise figure limit $NF_{lim}$. With the embodiments compared in Table 1, the threshold average noise figure for design D1 700 is 6.4 dB, for design D2 800, it is 6.7 dB, and for design D3 900, it is 7.0 dB.

Because the threshold average noise figure for design D3 is significantly greater than that of D1 and D2, the average noise figure for design D3 can be increased further, in order to reduce the overall pump power consumption of the EDFA. This trade-off between average noise figure and pump power consumption is enabled by the beneficial C-band ASE 330 that is allowed to propagate through the BSF.

FIG. 12*b* is a graph showing, for each EDFA design D1, D2 and D3 according to embodiments, a maximum noise figure as a function of its average noise figure, for multiple configurations having an optimized compromise between EDFA power consumption and average noise figure. For each OA 105 of a configuration, the transmission spectrum of GFFs 115, the length of EDFs 225 and the pump power of each pumping source 710 in each OA is optimized. As with FIG. 12*a*, the parameters in Table 1 and FIG. 11 are not necessarily the same as those of embodiments underlying FIG. 12*b*. In FIG. 12*b*, the maximum noise figure for each configuration of each design D1, D2 and D3, is less than or equal to a maximum noise figure limit $NF_{lim}$ 1215.

An L-band EDFA 500 according to embodiments can include at least two OAs 105, and in an embodiment, it includes three OAs 105. In any case, the OAs can be separated by an optical band-stop filter (BSF) 505. Each OA 105 can be powered by one or more optical pumping sources 107 to provide optical pumping either in the same direction as the optical signals to be amplified (forward pumping 215), or in the opposite direction (backward pumping 230). The optical pumping light can be provided by an optical pumping source such as a diode laser or a fiber laser operating at approximately 980 nm and/or 1480 nm, however, other wavelengths are possible, depending on what kind of OAs is used. Gain flattening filters (GFF) 115 can be placed after the first and second OAs 105, to tailor the external gain spectrum of the optical output of the EDFA 500. A variable optical attenuator (VOA) 120 can be placed before the third OA 105, to enable the EDFA to operate at different nominal gain settings. Finally, an LPF 110 can be placed after the third OA, in order to remove any C-band ASE co-propagating with the amplified L-band signals at the optical output 510.

The internal architecture of an OA 105 can contain an EDF 225 enabling the amplification of optical signals in a range between approximately 1500 nm and 1630 nm. The OA 105 can further include one or more WDMs 220 allowing both an optical input 205 containing signals to be amplified, and optical pumping light 215, 230 from one or more pumping sources 107, to be coupled into the EDF 225. Within an OA 105, the one or more WDMs 220 can be used to couple pumping light from one or more different pumping sources 107 that are provided to the OA 105. An ISO 210 can be located at the input of the OA 105, and another ISO 210 can be at the output, in order to prevent performance degradation of the EDFA 505 by various phenomena such as counter propagating ASE build-up, parasitic lasing or multipath interference.

An EDF 225 within each OA 105 can be characterized by having the capacity to enable optical propagation along its longitudinal axis and by containing an amount of erbium dopants enabling the optical amplification in a range of wavelengths between 1450 nm and 1630 nm, when optical pumping is provided with a typical wavelength at around 980 nm and/or 1480 nm. The EDF 225 can possess a circular glass core, contained within a circular glass cladding, and the refractive index of the glass core can be larger than the refractive index of the glass cladding, such as to enable optical propagation via total internal reflection. However, embodiments also include an EDF 225 having significant differences from this design, as it should be apparent to a person of ordinary skill in the art. Such differences include an EDF containing several glass cores distributed within one glass cladding, an EDF made of, or containing, crystalline materials, a double-cladding EDF enabling optical propagation in the glass core and glass cladding simultaneously, an EDF co-doped with other optically active dopants such as rare-earth ions (e.g. ytterbium, thulium, etc.), transition metals (e.g. copper, iron, nickel, etc.) or post-transition metals (e.g. lead, bismuth, etc.), etc.

Each optical pumping source 107 used to power an OA 105 can be characterized by its ability to excite doping ions. In the case of an EDF, such ions can be erbium ions within the EDF 225, excitable from a ground state identified as state $^4I_{15/2}$, to a first excited state identified as state $^4I_{13/2}$. This can be accomplished by using optical radiation produced by laser diodes operating at around 976 nm and/or around 1480 nm, although it should be apparent to a person of ordinary skill in the art that other optical wavelengths, such as 800 nm, 650 nm and 532 nm (in the case of singly-doped EDFs), and 915 nm (in the case of ytterbium co-doped EDFs), or a combination thereof, can also be used for optical pumping of an EDF, as long as it enables direct or indirect transitions (i.e. excitations) of erbium ions to state $^4I_{13/2}$.

As shown in FIG. 2, optical pumping light 215 can be coupled into the EDF 225 of an OA 105, through a WDM 220 located at either or both extremities of the EDF 225. However, in a case where several different pumping wavelengths are used, several sources can be used, and several WDMs 220 can be used in order to couple the different pumping wavelengths 215 from the several sources into the EDF 225. Moreover, an OA 105 does not necessarily require optical pumping from both of its extremities, and in such cases, it would not require a WDM at both extremities of the EDF either. In many cases, a single source of optical pumping and a single WDM, both located at either the input or output of the EDF, can suffice. Finally, it is not necessary for all OAs 225 within an EDFA 500 to possess the same configuration of optical pumping sources and WDMs, i.e. their design can vary.

Each BSF 505 between two OAs 105 should have a loss spectrum that is similar to that shown in FIG. 6. However, the parameters of the BSF shouldn't be restricted to the parameters shown in FIG. 6 as they can change depending on the design and requirements of the L-band EDFA. Specifically, a cut-off wavelength $\lambda_{off}$ should be chosen so that the BSF 505 induces minimal losses in the signal band, i.e. the range of optical wavelengths covered by the L-band. The cut-off wavelength $\lambda_{off}$ can therefore be located in the range of optical wavelengths from 1560 nm to 1575 nm. The cut-on wavelength $\lambda_{on}$ can be in the vicinity of a wavelength where the internal gain of the EDFA is near zero, which in the case of FIG. 3 is roughly 1550 nm. The cut-on wavelength $\lambda_{on}$ should be lower than the cut-off wavelength $\lambda_{off}$. In general, the cut-on wavelength can therefore be located within the range between 1520 nm and $\lambda_{off}$. In order to ensure proper filtering of detrimental C-band ASE, the filter depth D 630 of a BSF should be greater than 30 dB, although a less optimal depth between 30 dB and 10 dB can also be used.

The BSF used in the present invention can be implemented using various technologies including, but not limited to, thin-film filters, fiber Bragg grating, volume Bragg grating, micro-structured fiber technology, etc. Moreover, components that mimic the behavior of the BSF by adding the BSF's functionality to an existing component such as a GFF, an ISO or a WDM, should also be understood as being included in the scope of the present invention.

Embodiments include an array of multiple EDFAs, propagating the same or different signals in parallel, such as to form a cable. An EDFA cable can contain a plurality of separate EDFAs, each one made of successive EDFs, that can be laid out in a variety of ways including as flat ribbon, a stranded cable and a helically stranded cable.

If the EDFAs of an array are side-by-side on the same plane such that each EDFA has at most two neighbors, the array can be referred to as a "ribbonized EDFA". A ribbonized EDFA contains a plurality of EDFAs in parallel, each EDFA being made from a plurality of EDFs in sequence. A portion of a ribbonized EDFA containing only EDFs can be referred to as a ribbonized EDF.

Figure 13A:
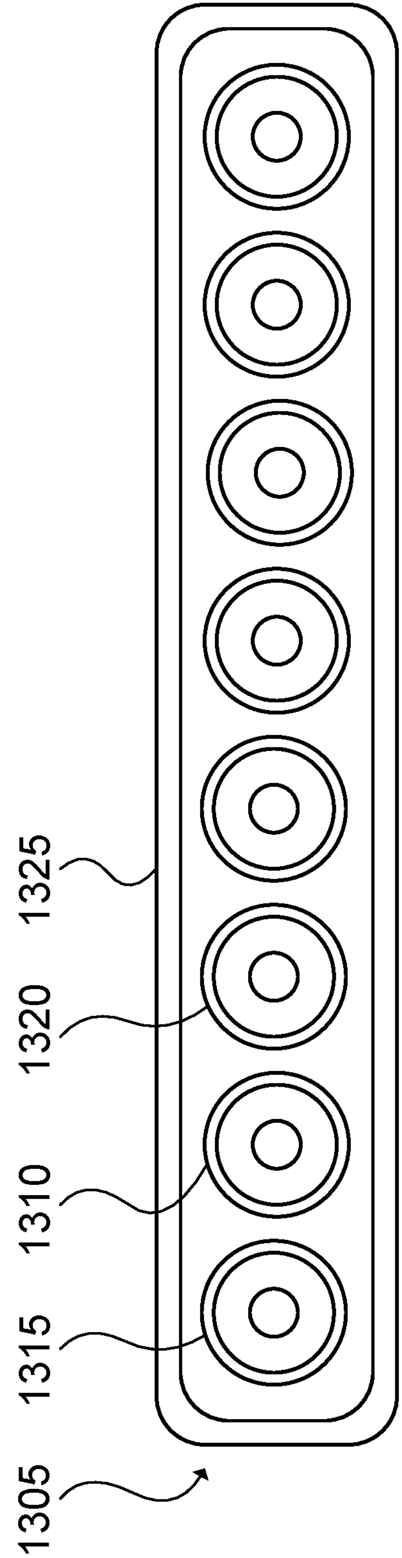
FIG. 13*a* is a cross-section of a ribbonized EDF cable, according to an embodiment.

FIG. 13*a* is a cross-section of a ribbonized EDF, according to an embodiment. A ribbonized EDF 1305 includes multiple EDFs 1310, each EDF having at most two neighboring EDFAs, one on the left 1315 and one on the right 1320. The structure can be held together with an enclosure 1325 or by other means. By adding appropriate components, ribbonized EDFs can be part of a ribbonized EDFA.

Figure 13B:
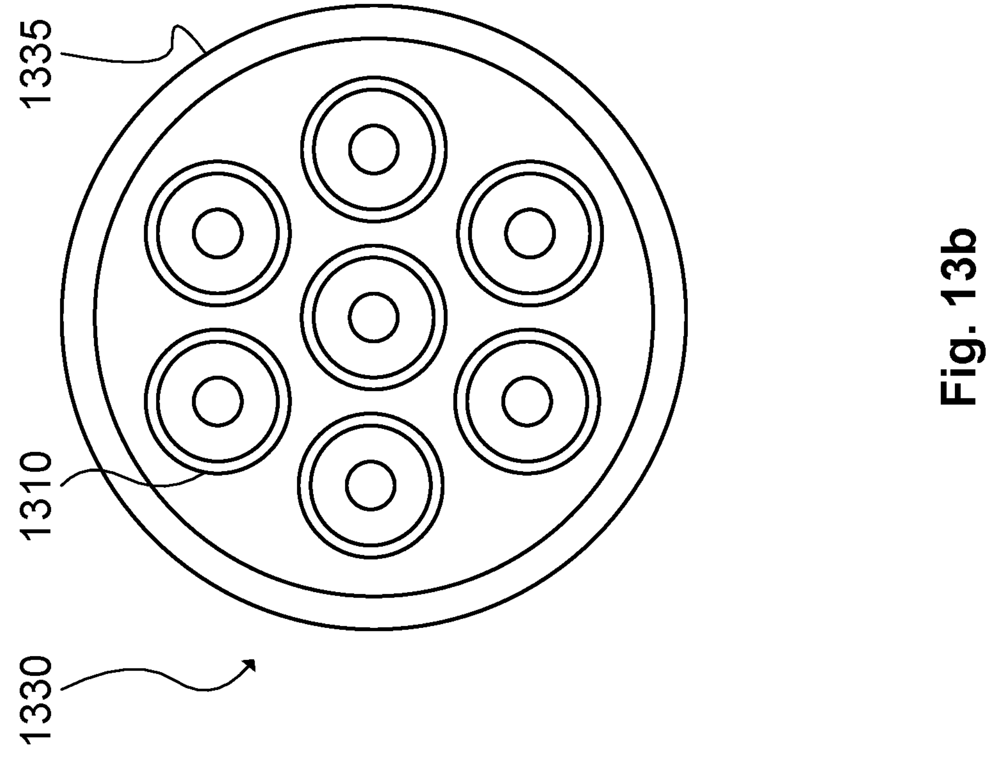
FIG. 13*b* is a cross-section of a stranded EDF cable, according to an embodiment

FIG. 13*b* is a cross-section of a stranded EDF cable, according to an embodiment. A stranded EDF cable 1330 includes multiple EDFs 1310, in a configuration that can be generally straight, random or helical. The structure can be held together with an enclosure 1335 or by other means. By adding appropriate components, an EDF cable can be part of an EDFA cable.

Although FIG. 13*b* has circular symmetry, embodiments include cables having a cross-section that is not circular. Neighboring cross-sections can be oriented similarly or differently, depending on whether an EDF cable configuration is generally straight, random or helical.

Figure 13C:
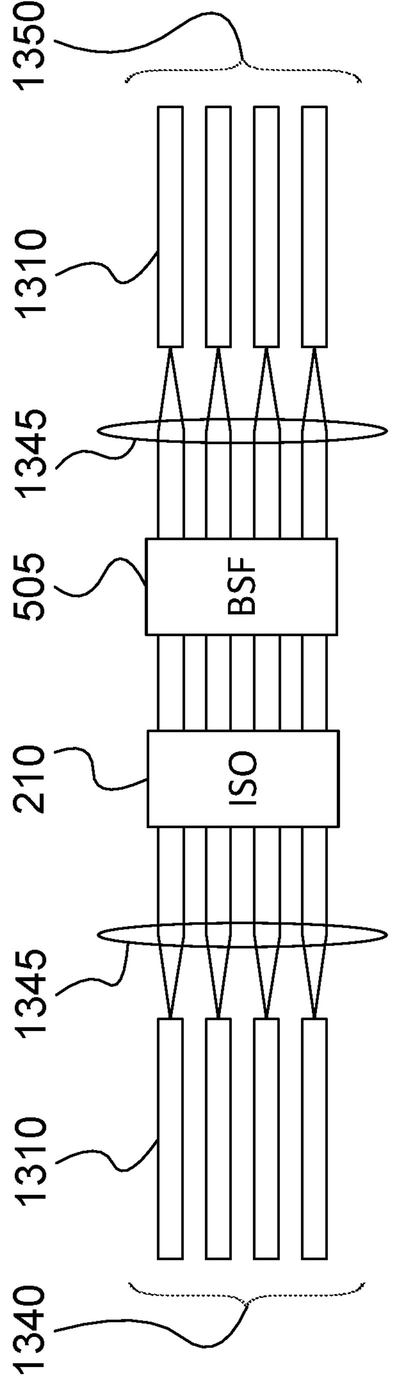
FIG. 13*c* is a schematic of an internal design for a BSF portion of an EDFA, in which light propagates through different, parallel optical fibers, according to an embodiment.

FIG. 13*c* is a schematic of an internal design for a BSF portion of an EDFA, in which light propagates through different, parallel optical fibers, according to an embodiment. An optical input 1340 propagates through multiple fibers 1310 of a cable, and exits through a first lens 1345 to be collimated. It is then transmitted through a first ISO 210, and filtered by a BSF 505. It can be transmitted through a second ISO (not shown), and be focused in fibers 1310 of a second cable from where it can later exit as an optical output 1350.

In another embodiment, an EDFA can be a multicore EDFA, where instead of an OA having a single core EDF, an OA has a multicore EDF characterized by having several erbium-doped cores contained in the same cladding. In either case of an EDFA cable or a multicore EDFA, one BSF 505 can be sufficient to filter out detrimental C-band ASE generated in the different EDFs 225 composing the EDFA cable, or the different erbium-doped cores composing the multicore EDFA.

An embodiment allows an L-band EDFA to consume less optical power, by using one or more BSFs instead of LPFs, between OAs. In contrast to a LPF, a BSF enables beneficial C-band ASE generated in a first OA, to propagate to a subsequent OA, and to serve as an additional source of pumping light.

In an EDFA that includes BSFs, such as design D3 900, the length of an optical fiber section, such as an EDF, can be shorter than in other designs. This is a benefit of using an embodiment, because in an extended L-band EDFA, a longer EDF length can be a significant hurdle towards reducing its footprint and enabling their integration into a small-form pluggable package.

The implementation of an embodiment in a commercial product does not necessarily require additional components, and does not require additional manufacturing cost. One or more LPFs can simply be exchanged for one or more BSFs.

An EDFA according to embodiments can include at least two OAs, and in an embodiment, there are three OAs. C-band ASE generated by a first OA can be propagated to a forward or backward facing port of one or more further OAs through one or more BSFs, whether they are located before or after the first OA. In FIG. 14*a* to FIG. 14*i*, dashed lines indicate the possibility of further components according to configurations of further embodiments.

Figures 14A, 14B:
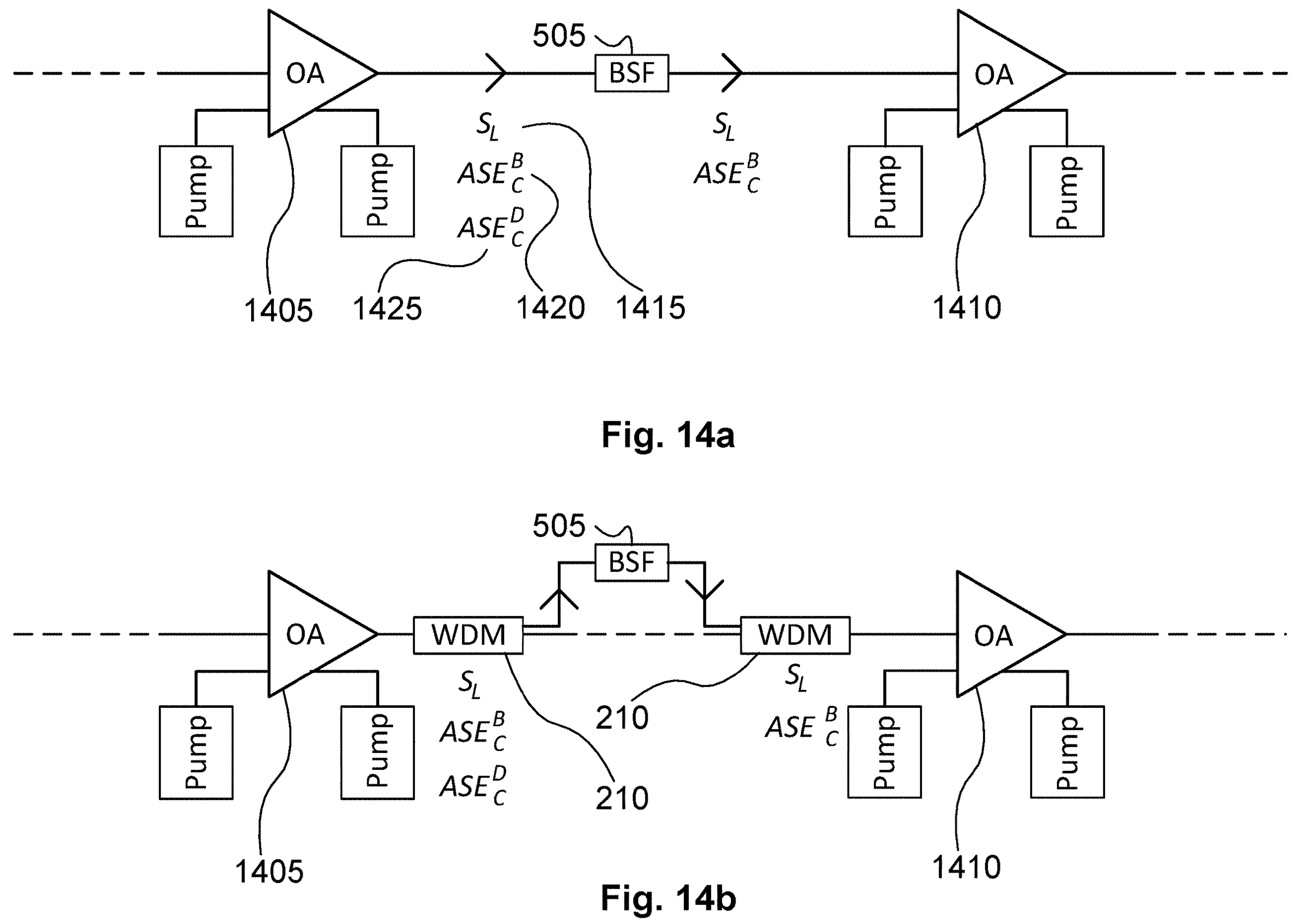
FIG. 14*a* illustrates an EDFA according to an embodiment where C-band ASE generated by a first OA is propagated to one or more other OAs.
FIG. 14*b* illustrates an EDFA according to an embodiment where C-band ASE generated by a second OA is propagated to a third OA.

FIG. 14*a* illustrates an EDFA according to an embodiment where C-band ASE generated by a first OA is propagated in the forward direction to a rear port of one or more other OAs, according to embodiments. The signal $S_L$ 1415 and beneficial C-band $$ASE_C^B$$

from a first OA 1405 can reach a second OA 1410 and a BSF 505 can filter out detrimental C-band $$ASE_C^D$$

1425. A similar path can also exist from the second OA 1410 to a subsequent OA, and/or from a previous OA to the first OA 1405, and so on.

FIG. 14*b* illustrates an EDFA according to an embodiment where C-band ASE generated by a first OA is propagated in the forward direction to one or more other OAs, via wavelength division multiplexers and demultiplexers, according to embodiments. This embodiment is similar to that in FIG. 14*a*, but with the addition of WDM, before end after a BSF 505. A similar path can also exist from the second OA 1410 to a subsequent OA, and/or from a previous OA to the first OA 1405, and so on.

Figures 14C, 14D:
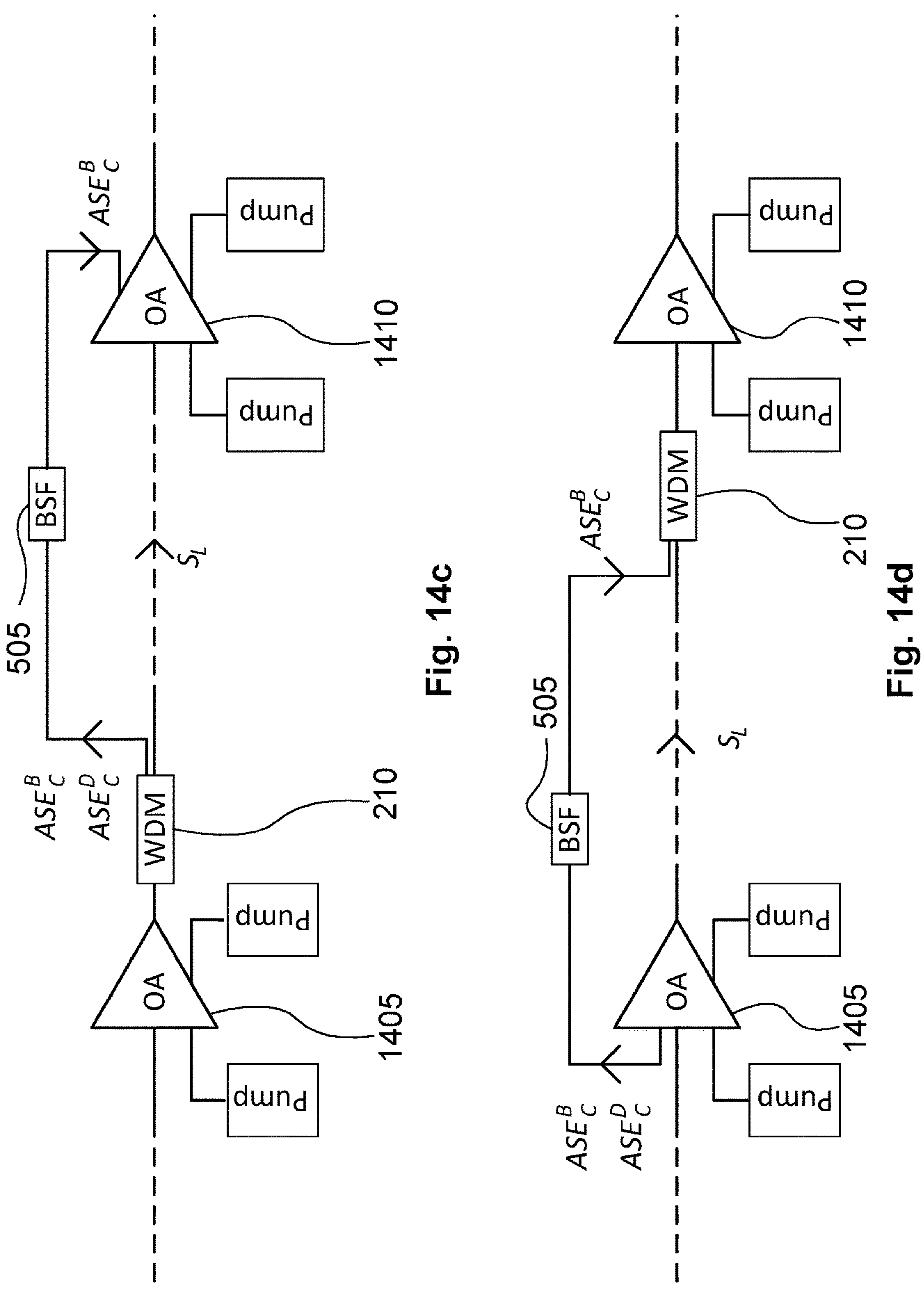
FIG. 14*c* illustrates an EDFA according to an embodiment where C-band ASE generated by a first OA is propagated in the forward direction to a front port of one or more other OAs, according to embodiments.
FIG. 14*d* illustrates an EDFA according to an embodiment where C-band ASE generated by a first OA is propagated from a rear port, in the forward direction to a WDM behind one or more other OAs, according to embodiments.

FIG. 14*c* illustrates an EDFA according to an embodiment where C-band ASE generated by a first OA is propagated in the forward direction to a front port of one or more other OAs, according to embodiments. Beneficial C-band ASE from a first OA 1405 can be directed to a front port of a second OA 1410, via a WDM 210 and a BSF 505. A similar path can also exist from the second OA 1410 to a subsequent OA, and/or from a previous OA to the first OA 1405, and so on.

FIG. 14*d* illustrates an EDFA according to an embodiment where C-band ASE generated by a first OA is propagated from a rear port, in the forward direction to a WDM behind one or more other OAs, according to embodiments. Beneficial C-band ASE can exit from a rear port of a first OA 1405 and be directed to a WDM 210 behind a second OA 1410, via a BSF 505. A similar path can also exist from the second OA 1410 to a subsequent OA, and/or from a previous OA to the first OA 1405, and so on.

Figures 14E, 14F:
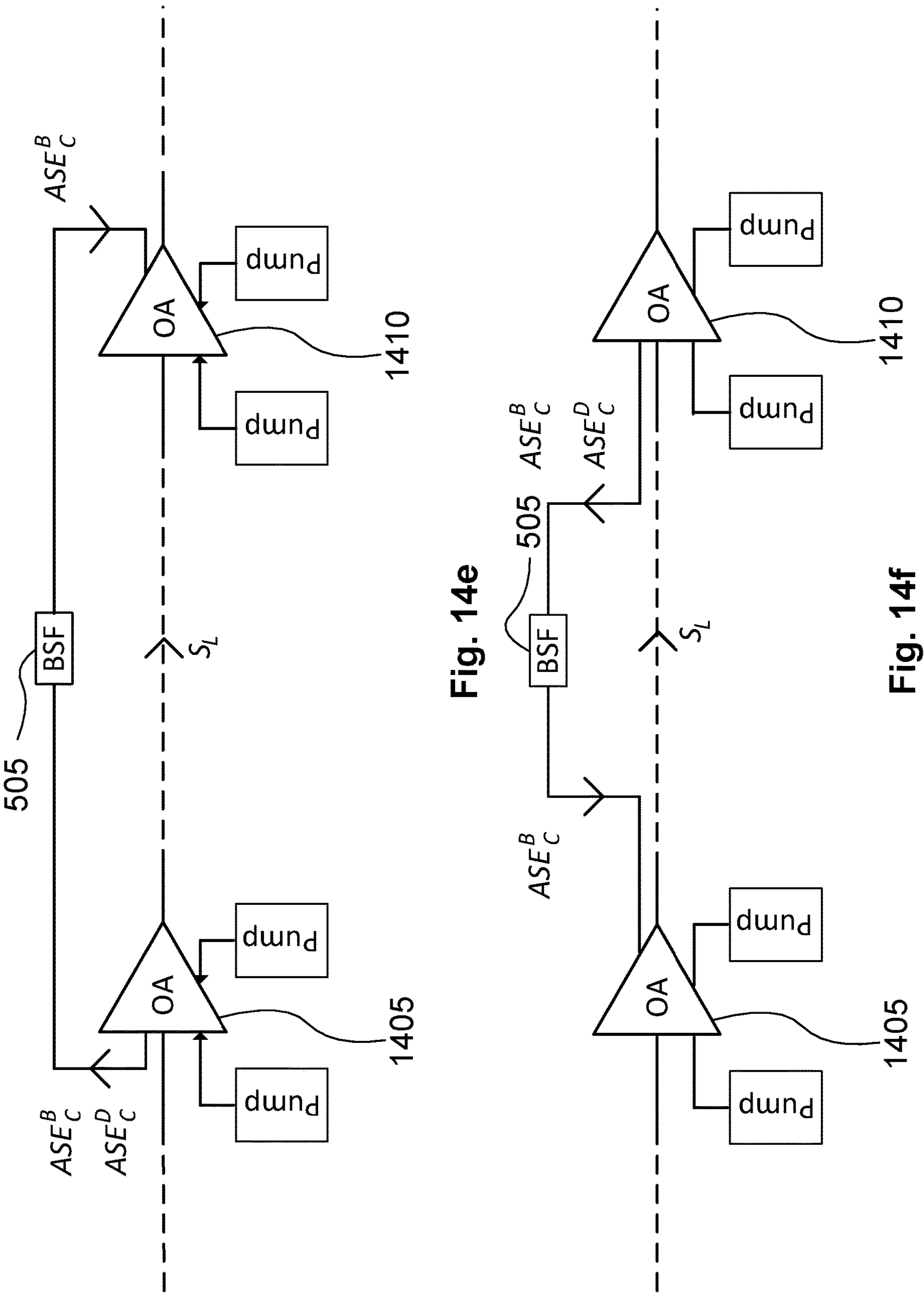
FIG. 14*e* illustrates an EDFA according to an embodiment where C-band ASE generated by a first OA is propagated from a rear port, in the forward direction, to a front port of one or more other OAs, according to embodiments.
FIG. 14*f* illustrates an EDFA according to an embodiment where C-band ASE generated by an OA is propagated from a rear port, in the backward direction, to a front port of one or more previous OAs, according to embodiments.

FIG. 14*e* illustrates an EDFA according to an embodiment where C-band ASE generated by a first OA is propagated from a rear port, in the forward direction, to a front port of one or more other OAs, according to embodiments. Beneficial C-band ASE can exit from a rear port of a first OA 1405 and be directed to a front port of a second OA 1410, via a BSF 505. A similar path can also exist from the second OA 1410 to a subsequent OA, and/or from a previous OA to the first OA 1405, and so on.

FIG. 14*f* illustrates an EDFA according to an embodiment where C-band ASE generated by an OA is propagated from a rear port, in the backward direction, to a front port of one or more previous OAs, according to embodiments. Beneficial C-band ASE can exit from a rear port of a second OA 1410 and be directed to a front port of a first OA 1405, via a BSF 505. A similar path can also exist from the first OA 1405 to a previous OA, and/or from a subsequent OA to the second OA 1410, and so on.

Figures 14G, 14H:
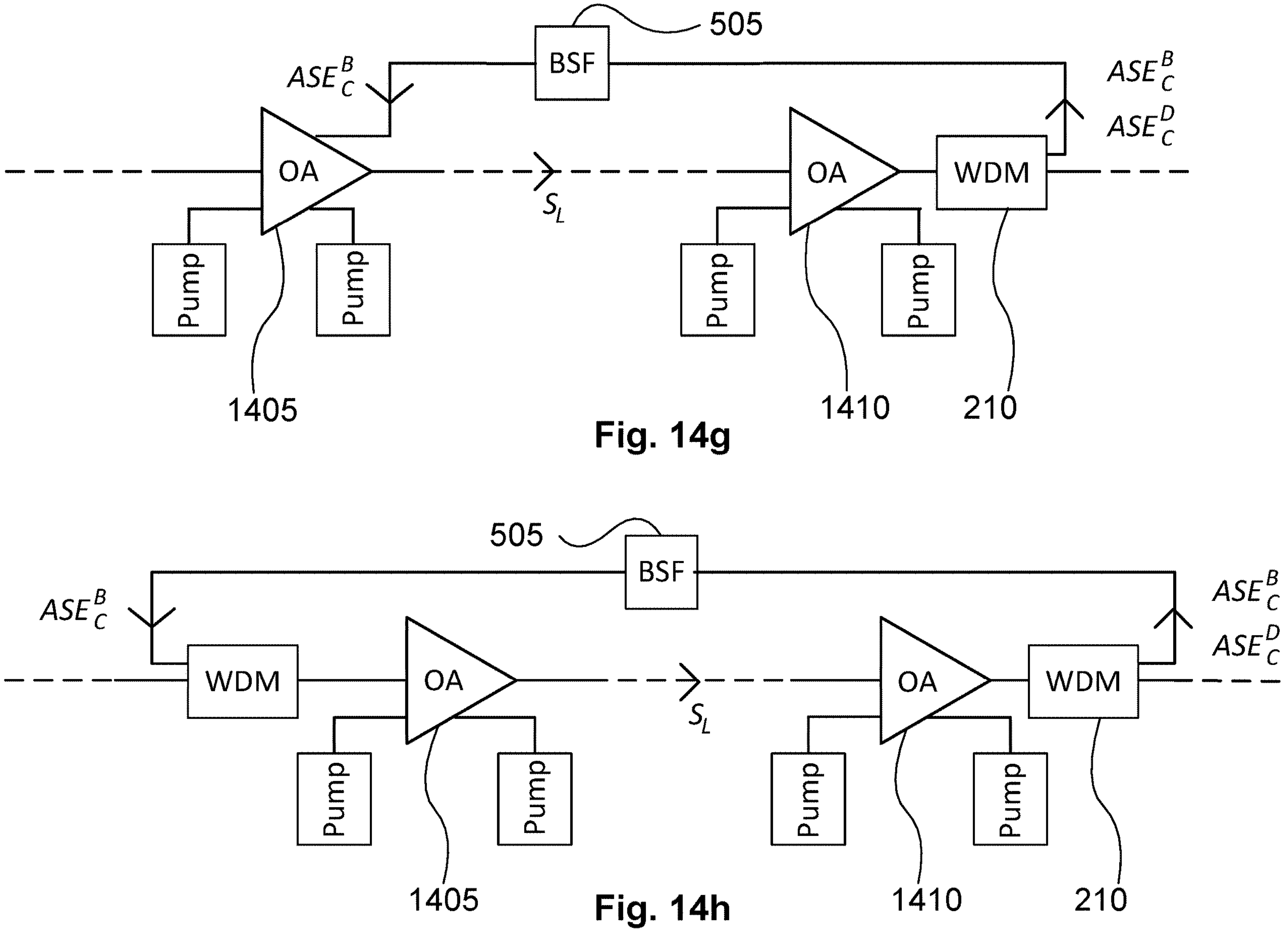
FIG. 14*g* illustrates an EDFA according to an embodiment where C-band ASE generated by an OA is propagated in the backward direction to a front port of one or more previous OAs, via a WDM and a BSF, according to embodiments.
FIG. 14*h* illustrates an EDFA according to an embodiment where C-band ASE generated by an OA is propagated in the backward direction to a rear port of one or more previous OAs, via a WDM and then a BSF, according to embodiments.

FIG. 14*g* illustrates an EDFA according to an embodiment where C-band ASE generated by an OA is propagated in the backward direction to a front port of one or more previous OAs, via a WDM and a BSF, according to embodiments. Beneficial C-band ASE can exit from the front of a second OA 1410 and be directed to a front port of a first OA 1405, via a WDM 210 and a BSF 505. A similar path can also exist from the second OA 1410 to another previous OA, and/or from a subsequent OA to the second OA 1410, and so on.

FIG. 14*h* illustrates an EDFA according to an embodiment where C-band ASE generated by an OA is propagated in the backward direction to a rear port of one or more previous OAs, via a WDM and then a BSF, according to embodiments. Beneficial C-band ASE can exit from the front of a second OA 1410 and be directed to a rear port of a first OA 1405, via a WDM 210 and a BSF 505. A similar path can also exist from the second OA 1410 to another previous OA, and/or from a subsequent OA to the second OA 1410, and so on.

Figure 14I:
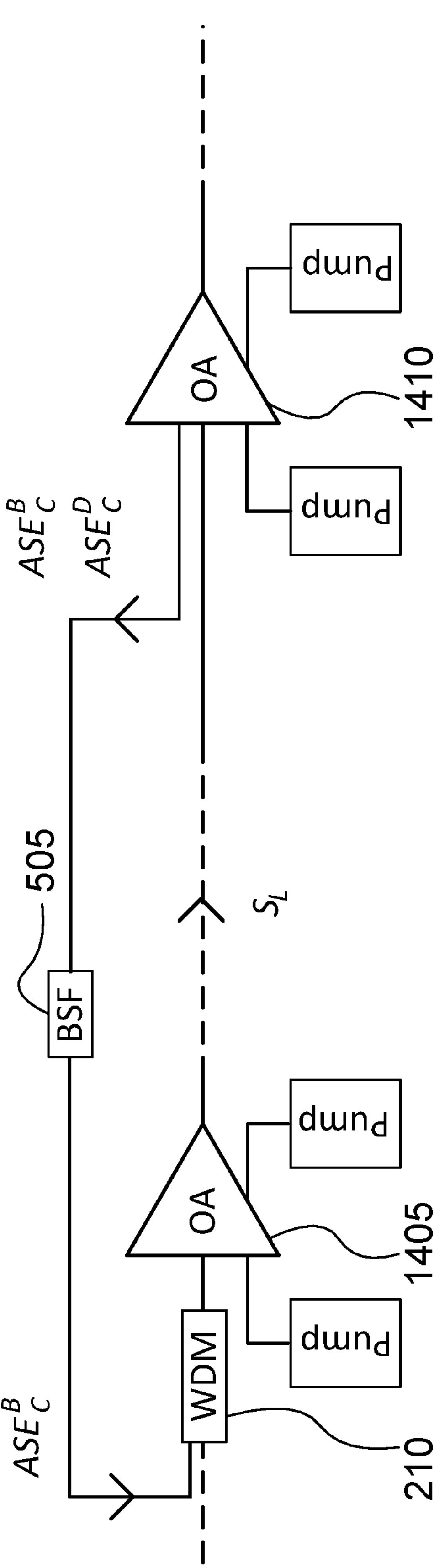
FIG. 14*i* illustrates an EDFA according to an embodiment where C-band ASE generated by an OA is propagated in the backward direction to a rear port of one or more previous OAs, via a BSF and then a WDM, according to embodiments.

FIG. 14*i* illustrates an EDFA according to an embodiment where C-band ASE generated by an OA is propagated in the backward direction to a rear port of one or more previous OAs, via a BSF and then a WDM, according to embodiments. Beneficial C-band ASE can exit from the rear of a second OA 1410 and be directed to a rear port of a first OA 1405, via a BSF 505 and then a WDM 210. A similar path can also exist from the second OA 1410 to another previous OA, and/or from a subsequent OA to the second OA 1410, and so on.

Embodiments include systems with the above paths, systems with a combination of those paths, systems with equivalent paths from one OA to an OA between or beyond the first 1405 or second 1410 OA, and systems with combinations of such paths. Components such as a BSF 505 and a LPF 110 can be added to filter out detrimental and unnecessary optical radiation. Additional components, such as a GFF, and a VOA can be inserted as required to fulfill the functions described in relation to FIG. 5.

Embodiments include systems with any combination of paths as described above, as well as systems in which any OA provides beneficial C-band ASE to any other OA by any such path.

It should be apparent to a person of ordinary skill in the art that other designs may be possible without departing from the scope of these embodiments. To implement such designs, components such as WDMs enabling wavelength selective coupling to separate C-band light and L-band light can be used, however other alternatives can also be used. In each case, beneficial C-band ASE generated by a given OA and propagated towards another OA, is first filtered by a BSF 505.

An embodiment shown in any of FIG. 14*a* to FIG. 14*h* can be modified for any of their OAs to further include one or more optical circulators (CIRC). When a CIRC is part of an OA, as an input port and/or an output port, the CIRC can enable backward ASE to be extracted via the input of the OA. This ASE can then be propagated backward to a front or rear port of a preceding OA (in an opposite direction to forward propagating amplified signals).

Figure 15:
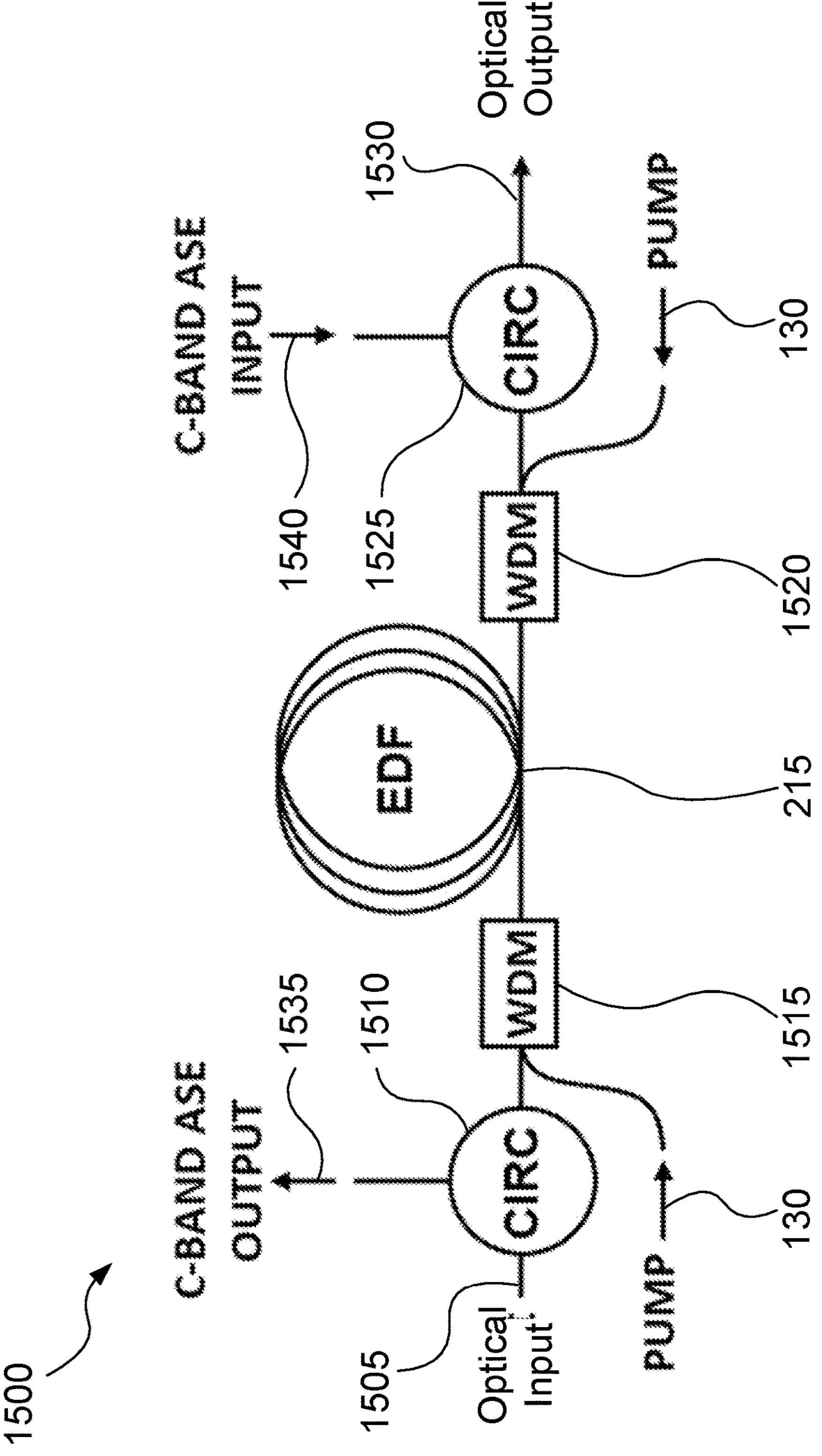
FIG. 15 illustrates an OA with an optical circulator (CIRC) as an input port and another CIRC as an output port, according to an embodiment.

FIG. 15 illustrates an OA that includes a CIRC as an input port and another CIRC as its output port, according to an embodiment. The OA 1500 includes an EDF 215 in which amplification by stimulated emission occurs. The optical input signal 1505 passes through a first CIRC 1510 and a first WDM 1515. Then, it gets amplified in the EDF 215, and passes through a second WDM 1520 and a second CIRC 1525, before exiting as a desirable optical output 1530. Backward propagating C-Band ASE generated by the EDF exits the OA as output 1535 that can be subsequently split into beneficial and detrimental C-band ASE. Beneficial C-band ASE generated by other OAs can be injected via output CIRC 1540.

Embodiments allow a reduction in the power consumption of an L-band EDFA, by recycling backward and/or forward beneficial C-band ASE generated in each OA.

Within an L-band EDFA that contains OAs according to embodiments, the use of BSFs to filter C-band ASE produced by the OAs, and propagated towards other OAs, can significantly improve the power conversion efficiency (PCE) of the EDFA.

The efficiency of an L-band EDFA according to embodiments, can rely on a property of erbium ions by which for wavelengths between 1530 nm and 1540 nm, which is in the C-band near the emission cross-section's peak, the erbium ions can provide an amplification of over 10 times the amplification of L-band wavelengths between 1575 nm and 1626 nm, i.e. wavelengths that are farther away and red-shifted from the peak. Hence, at the output of its stages, a multi-stage EDFA designed for L-band amplification can produce C-band ASE that can be re-used as optical pumping for other stages.

An embodiment can allow a 40% reduction in the consumption of an L-band EDFA's optical pumping power, while maintaining the EDFA's NF within constraints.

An embodiment can allow a reduction in an L-band EDFA's length. For example, it can allow the integration of an L120 EDFA in a small-form pluggable packaging format.

An embodiment can include the use of a BSF having specifications that are in line with commercial thin-film deposition capabilities.

An embodiment can include the use of a BSF that is compatible with a space division multiplexing (SDM) amplifier architecture such as a few-mode EDFA, a multicore EDFA, an EDFA cable, a ribbonized EDFA, etc.

In an embodiment, a single BSF can be used between amplification stages for multicore EDFAs and EDFA cables, whether or not they are ribbonized.

An EDFA according to embodiments can be made of a multicore EDFs, few-mode EDFs, and it can be an array of L-band EDFs.

In an embodiment, the material of a segment of optical fiber can be an oxide glass such as silicate glass, it can be a fluoride glass such as zirconium fluoride glass or indium fluoride glass, or it can be a chalcogenide glass.

Embodiments include a system for amplifying an optical signal comprising: a first optical amplifier including an emitting segment of doped optical fiber emitting an optical output, the optical output including the optical signal at a first wavelength band, the optical output also having an optical surplus wavelength band and an optical pumping wavelength band; at least one optical component, and a second optical amplifier including a receiving segment of doped optical fiber; wherein: the at least one optical component receives the optical output from the emitting segment of doped optical fiber and is configured to prevent at least part of the optical surplus wavelength band from propagating to the receiving segment of doped optical fiber, and transmit the optical pumping wavelength band from the emitting segment of doped optical fiber to the receiving segment of doped optical fiber; and the receiving segment of doped optical fiber is doped to: be optically pumped by the optical pumping wavelength band, and amplify the optical signal by stimulated emission of radiation.

In some aspects, an optical component is a band-stop filter.

In some aspects, a system further comprises at least one independent source of optical radiation appropriate to optically pump at least one segment of optical fiber.

In some aspects, a system further comprises, between the emitting segment of doped optical fiber and the receiving segment of doped optical fiber, at least one of a gain flattening filter, a variable optical attenuator, an optical isolator, a wavelength-division multiplexer, a wavelength-division demultiplexer, a lens, and an optical circulator.

In some aspects, the receiving segment of doped optical fiber is configured to amplify optical signals with optical wavelengths in the L-band.

In some aspects, at least one segment of doped optical fiber is doped with erbium ions.

In some aspects, at least one segment of doped optical fiber includes oxide glass.

In some aspects, the oxide glass is silicate glass.

In some aspects, at least one segment of doped optical fiber includes fluoride glass.

In some aspects, the fluoride glass is one of zirconium fluoride glass and indium fluoride glass.

In some aspects, at least one segment of doped optical fiber includes chalcogenide glass.

In some aspects, at least one segment of doped optical fiber lies in parallel next to at least one other segment of doped optical fiber to form a cable to direct the optical output from the cable to the same optical component.

In some aspects, the cable is ribbonized such that the multiple segments of optical fiber lie in parallel on a common plane.

In some aspects, at least one segment of optical fiber has multiple cores, such that the optical output from each core is directed to the same optical component.

In some aspects, the optical fiber cores are ribbonized such that the multiple optical fiber cores lie on a common plane.

In some aspects, at least one segment of optical fiber is a segment of multi-mode optical fiber, the optical output of which includes multiple optical modes that are directed to the same optical component.

In some aspects, the at least one optical component has a rejection level for the optical surplus portion that is greater than 10 dB.

In some aspects, an optical component is any of a thin film filter, a fiber Bragg grating, a volume Bragg grating, and a micro-structured optical fiber.

In some aspects, a receiving segment of doped optical fiber emits an amplified optical output that includes the optical signal after being amplified.

Some aspects further include a low-pass filter for attenuating portions of the amplified optical output other than the optical signal after being amplified.

In some aspects, the first optical amplifier including an emitting segment of doped optical fiber, and the second optical amplifier including a receiving segment of doped optical fiber, are configured in series such that an intermediate optical amplifier including an intermediate segment of doped optical fiber in the series is both a receiving segment of doped optical fiber and an emitting segment of doped optical fiber.

Embodiments include a method of amplifying an optical signal comprising a receiving segment of doped optical fiber receiving from an emitting segment of doped optical fiber, via an optical component, an optical output that includes the optical signal at a first wavelength band, and an optical pumping wavelength band; and amplifying the optical signal by stimulated emission of radiation; wherein the optical component is operative to prevent at least part of an optical surplus wavelength band of the optical output from propagating to the receiving segment of doped optical fiber, and transmit the optical pumping wavelength band from the emitting segment of doped optical fiber to the receiving segment of doped optical fiber; and the receiving segment of doped optical fiber is doped to: be optically pumped by the optical pumping wavelength band, and amplify the optical signal by stimulated emission of radiation.

In some aspects, the at least one optical component is a band-stop filter.

Some aspects further include at least one segment of doped optical fiber receiving from at least one independent source, optical radiation appropriate to optically pump the at least one segment of doped optical fiber.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A system for amplifying an optical signal comprising:

a first optical amplifier including a first segment of doped optical fiber configured to generate an optical output including the optical signal at a first wavelength band, an optical surplus wavelength band, and an optical pumping wavelength band, the optical surplus wavelength band being located spectrally between the first wavelength band and the optical pumping wavelength band;

a second optical amplifier including a second segment of doped optical fiber; and at least one optical component optically coupled between the first optical amplifier and the second optical amplifier, wherein:

the at least one optical component is configured to:

receive the optical output from the first segment of doped optical fiber of the first optical amplifier;

prevent a transmission of at least part of the optical surplus wavelength band from the first segment of doped optical fiber to the second segment of doped optical fiber; and transmit the first wavelength band and the optical pumping wavelength band from the first segment of doped optical fiber to the second segment of doped optical fiber, the second segment of doped optical fiber being configured to be optically pumped by the transmitted optical pumping wavelength band to provide population inversion for amplifying the optical signal by stimulated emission of radiation.

2. The system of claim 1, wherein the at least one optical component is a band-stop filter.

3. The system of claim 1, further comprising at least one independent source of optical radiation configured to optically pump at least one of the first segment of doped optical fiber and the second segment of doped optical fiber.

4. The system of claim 1, further comprising, optically coupled between the first optical amplifier and the second optical amplifier, at least one of:

a gain flattening filter, a variable optical attenuator, an optical isolator, a wavelength-division multiplexer, a wavelength-division demultiplexer, a lens, and an optical circulator.

5. The system of claim 1, wherein the second segment of doped optical fiber is configured to amplify optical signals with optical wavelengths in the L-band.

6. The system of claim 1, wherein at least one of the first segment of doped optical fiber and the second segment of doped optical fiber is doped with erbium ions.

7. The system of claim 1, wherein at least one of the first segment of doped optical fiber and the second segment of doped optical fiber includes oxide glass.

8. The system of claim 7, wherein the oxide glass is silicate glass.

9. The system of claim 1, wherein at least one of the first segment of doped optical fiber and the second segment of doped optical fiber includes fluoride glass.

10. The system of claim 9, wherein the fluoride glass is one of zirconium fluoride glass and indium fluoride glass.

11. The system of claim 1, wherein at least one of the first segment of doped optical fiber and the second segment of doped optical fiber includes chalcogenide glass.

12. The system of claim 1, wherein the first optical amplifier comprises a first cable including a plurality of parallel doped optical fibers, wherein the first segment of doped optical fiber is one of the plurality of parallel doped optical fibers, and wherein, when the system is in operation, optical outputs from the first cable are directed to the at least one optical component.

13. The system of claim 12, wherein the first cable is ribbonized such that the plurality of parallel doped optical fibers lie in a common plane.

14. The system of claim 1, wherein the first segment of doped optical fiber is a multi-core fiber, and wherein, when the system is in operation, optical outputs of multi-core fiber are directed to the at least one optical component.

15. The system of claim 14, wherein: the multi-core fiber comprises multiple cores that are ribbonized and lie on a common plane.

16. The system of claim 1, wherein the first segment of doped optical fiber is a multi-mode optical fiber, and, when the system is in operation, an optical output of the multi-mode optical fiber includes a plurality of optical modes that are directed to the at least one optical component.

17. The system of claim 1, wherein the at least one optical component has a rejection level for the optical surplus wavelength band that is greater than 10 dB.

18. The system of claim 1, wherein the at least one optical component includes any of a thin film filter, a fiber Bragg grating, a volume Bragg grating, and a micro-structured optical fiber.

19. The system of claim 1, wherein the second segment of doped optical fiber is configured to emit an amplified optical output that includes the optical signal after being amplified.

20. The system of claim 19, further comprising a low-pass filter attenuating portions of the amplified optical output other than the optical signal after being amplified.

21. A system for amplifying an optical signal comprising:

a first optical amplifier including a first segment of doped optical fiber configured to generate an optical output including the optical signal at a first wavelength band, an optical surplus wavelength band, and an optical pumping wavelength band, the optical surplus wavelength band being located spectrally between the first wavelength band and the optical pumping wavelength band;

a second optical amplifier including a second segment of doped optical fiber; and at least one optical component optically coupled between the first optical amplifier and the second optical amplifier, wherein:

the at least one optical component is configured to:

receive the optical output from the first segment of doped optical fiber of the first optical amplifier;

prevent a transmission of at least part of the optical surplus wavelength band from the first segment of doped optical fiber to the second segment of doped optical fiber; and transmit the first wavelength band and the optical pumping wavelength band from the first segment of doped optical fiber to the second segment of doped optical fiber, the second segment of doped optical fiber being configured to be optically pumped by the transmitted optical pumping wavelength band and to amplify the optical signal by stimulated emission of radiation, the system further comprising a third optical amplifier including a third segment of doped optical fiber, wherein the second optical amplifier is optically coupled in series with between the first optical amplifier and the third optical amplifier.

22. A method of amplifying an optical signal comprising, the method comprising:

generating, from a first segment of doped optical fiber, an optical output that includes the optical signal at a first wavelength band, an optical pumping wavelength band, and an optical surplus wavelength band, the optical surplus wavelength band being located spectrally between the first wavelength band and the optical pumping wavelength band;

filtering the optical output with a band-stop filter to prevent transmission of at least part of the optical surplus wavelength band while transmitting the first wavelength band and the optical pumping wavelength to a second segment of doped optical fiber; and amplifying the optical signal at the second segment of doped optical fiber by stimulated emission of radiation, wherein said amplifying is powered at least in part by optically pumping the second segment of doped optical fiber with the transmitted optical pumping wavelength band to provide population inversion.

23. The method of claim 22, further comprising optically pumping at least one of the first segment of doped optical fiber and the second segment of doped optical fiber with optical radiation from at least one independent source.

* * * * *